United States Patent
Cox et al.

(10) Patent No.: US 11,552,706 B2
(45) Date of Patent: Jan. 10, 2023

(54) OPTICAL COMMUNICATION METHODS AND SYSTEMS USING MOTION BLUR

(71) Applicant: Advanced Functional Fabrics of America, Inc., Cambridge, MA (US)

(72) Inventors: Jason Cox, Ashland, MA (US); Noah Lillian Drori, Boston, MA (US); Tairan Wang, Chelmsford, MA (US)

(73) Assignee: Advanced Functional Fabrics of America, Inc., Cambridge, MA (US)

( * ) Notice: Subject to any disclaimer, the term of this patent is extended or adjusted under 35 U.S.C. 154(b) by 21 days.

(21) Appl. No.: 16/832,066

(22) Filed: Mar. 27, 2020

(65) Prior Publication Data
US 2020/0313768 A1    Oct. 1, 2020

Related U.S. Application Data

(60) Provisional application No. 62/826,594, filed on Mar. 29, 2019.

(51) Int. Cl.
| | |
|---|---|
| *H04B 10/00* | (2013.01) |
| *H04B 10/116* | (2013.01) |
| *H04B 10/50* | (2013.01) |
| *G06T 7/20* | (2017.01) |

(52) U.S. Cl.
CPC ........... *H04B 10/116* (2013.01); *G06T 7/20* (2013.01); *H04B 10/502* (2013.01)

(58) Field of Classification Search
CPC ... G06T 7/00; G06T 7/20; G06T 2207/10032; G06T 2207/10; G06T 2207/10048; H04B 10/116; H04B 10/502; H04N 1/00307; H04N 2201/3252

USPC .......................................... 398/118, 119, 127
See application file for complete search history.

(56) References Cited

U.S. PATENT DOCUMENTS

| | | | |
|---|---|---|---|
| 10,148,354 B2 | 12/2018 | Oshima et al. | |
| 10,348,404 B1 * | 7/2019 | Herman | H04B 10/0793 |
| 2004/0096224 A1 | 5/2004 | Naruki et al. | |
| 2009/0135264 A1 * | 5/2009 | John | H04N 5/23248 348/E9.002 |
| 2015/0015544 A1 * | 1/2015 | Kim | G06F 3/0425 345/175 |
| 2019/0052358 A1 * | 2/2019 | Oshima | E05F 15/43 |

FOREIGN PATENT DOCUMENTS

JP     2007-013786 A    1/2007

* cited by examiner

*Primary Examiner* — Hibret A Woldekidan
(74) *Attorney, Agent, or Firm* — Wolf, Greenfield & Sacks, P.C.

(57) ABSTRACT

Optical communication systems and their method of operation are disclosed. In some embodiments, one or more images of one or more optical transmitters may be collected with an imaging device during relative motion between the imaging device and the one or more optical transmitters. The one or more optical transmitters may transmit bit stream segments as a pattern of sequential modulation cycles. The relative motion between the imaging device and the one or more optical transmitters may be sufficiently fast and an image integration time of the imaging device may be sufficiently long such that one or more bit stream segments transmitted by the one or more optical transmitters may be captured as one or more data traces in the images for subsequent decoding.

35 Claims, 13 Drawing Sheets

OPTICAL COMMUNICATION METHODS AND SYSTEMS USING MOTION BLUR

RELATED APPLICATIONS

This Application claims the benefit of priority under 35 U.S.C. 119(e) of U.S. Provisional Application Ser. No. 62/826,594, filed Mar. 29, 2019, the disclosure of which is incorporated herein by reference in its entirety.

FIELD

Disclosed embodiments are related to optical communication methods and systems using motion blur.

BACKGROUND

Optical communication systems typically utilize light emitting diodes (LEDs) or laser diodes as optical transmitters and the signals are typically received by receivers including photosensitive detectors such as photodiodes and CMOS cameras. At the most fundamental level, successful data transmission uses line of sight (LOS) between detector-receiver pairs and sufficient contrast in brightness, polarization, and/or color values to represent data. Smartphone CMOS cameras provide a powerful and nearly ubiquitous mobile receiver for free-space optical communications. As such, there are a number of efforts to use commercial lighting infrastructure to transmit data to smartphones for indoor positioning as may be used in retail and general data telemetry applications. Approaches using commercial lighting are called visible light communications (VLC) as the lights are often in the visible range of the electromagnetic spectrum and serve the dual purpose of providing lighting and data transmission.

Depending on the particular encoding scheme, the modulation (e.g. ON/OFF) cycles of a light source may result in flickering that is observable to a user which may be undesirable in certain applications. For example, applications utilizing smartphone cameras are bandwidth limited by the frame rate of the camera which is typically limited to about 30-240 frames per second (fps) which overlaps with flicker frequency ranges observable by the human eye. This frame rate limitation also limits the rate of data transmission to a maximum of 120 Hz if the frames alone were used to decode the data. In addition, tracking transmitters in motion using these types of transmission strategies also typically involve computationally expensive motion tracking algorithms that may further reduce the useable frame rate for data decoding and ultimately the bandwidth of the system as well. Therefore, typical optical communication systems strive to eliminate the relative motion between a transmitter and receiver as much as possible. Due to the difficulty and cost associated with increasing the frame rate of an imaging device, meaningful improvement in data transmission speeds using direct frame encoding are unlikely.

In contrast to using individual frames to transmit data, prior approaches to free space optical communication have also leveraged the rolling shutter effect to increase data rates and avoid observable flicker. For example, when using a rolling shutter encoding scheme, an imaging device may populate a single frame where individual rows of pixels are imaged individually before a full frame is integrated. If an optical transmitter were blinking at a rate slower than the row-imaging rate, a single frame may show a banded structure that represents periods of time where the optical transmitter is in its ON state and periods of time where it is in its OFF state. These states may occur on a time scale much faster than the frame rate of the camera. Such an approach may increase the bandwidth of the system while also eliminating observable flicker of the optical transmitter to an observer when using visible light sources. However, the relative size of the optical transmitter within the imaging device's field of view must be large as the number of bands present in the image represent individual bits. Therefore, typical rolling shutter encoding schemes attempt to have the optical transmitter occupy as much of the field of view of the imaging device as possible which limits the rolling shutter method to only transmitting single data streams at a time. In addition, optical communication systems using the rolling shutter method do not easily tolerate relative motion between a transmitter and receiver which results in the use of computationally expensive processing algorithms to handle distortions from the relative motion. Therefore, communication systems using the rolling shutter method, and other typical communication methods, tend to maximize the size of a transmitter within a field of view to increase the data rate transmission and accuracy while minimizing the relative motion between the transmitter and receiver.

SUMMARY

In one embodiment, an optical communication system includes an imaging device configured to collect one or more images of one or more optical transmitters during relative motion of the imaging device and the one or more optical transmitters. The imaging device also includes one or more processors configured to: identify one or more data traces in the one or more images; and decode the one or more data traces from a spatial domain of the one or more images to obtain one or more bit stream segments transmitted by the one or more optical transmitters.

In another embodiment, at least one non-transitory computer-readable storage medium storing processor executable instructions for optical communication that, when executed by at least one processor, cause the at least one processor to perform a method including: collecting one or more images of one or more optical transmitters during relative motion of an imaging device and the one or more optical transmitters; identifying one or more data traces in the one or more images; and decoding the one or more data traces from a spatial domain of the one or more images to obtain one or more bit stream segments transmitted by the one or more optical transmitters.

In yet another embodiment, a computer-implemented method for optical communication includes: collecting one or more images of one or more optical transmitters with an imaging device during relative motion between the imaging device and the one or more optical transmitters. The one or more optical transmitters transmit one or more bit stream segments as a pattern of sequential modulation cycles. Additionally, the relative motion is sufficiently fast and an image integration time of the imaging device is sufficiently long such that the one or more bit stream segments are captured as one or more data traces in the one or more images.

In still another embodiment, a computer-implemented method for optical communication includes: collecting one or more images of one or more optical transmitters with an imaging device during relative motion between the imaging device and the one or more optical transmitters to transmit data from the one or more optical transmitters to the imaging device. A rate of data transmission from the one or more optical transmitters to the imaging device is greater than or equal to 2 kilobits per second (kbps), and each of the one or more optical transmitters occupies less than 5% of a field of view of the imaging device during data transmission.

It should be appreciated that the foregoing concepts, and additional concepts discussed below, may be arranged in any suitable combination, as the present disclosure is not limited in this respect. Further, other advantages and novel features of the present disclosure will become apparent from the following detailed description of various non-limiting embodiments when considered in conjunction with the accompanying figures.

BRIEF DESCRIPTION OF DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
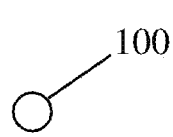
FIG. 1A is a schematic representation of an optical transmitter in an OFF state not emitting light.

The Inventors have recognized that prior approaches to handling the optical communication of data is either prone to slow transmission rates, observable flicker of optical transmitters, and/or sensitivity to motion between an optical transmitter and a corresponding imaging device, i.e. receiver. Accordingly, the Inventors have recognized the benefits associated with optical communication systems and methods of data transmission that use relative motion between an optical transmitter and a corresponding imaging device to transmit data. For example, the relative motion may result in the collection of a blurred imaged where the sequential modulation cycles of an optical transmitter may be captured as a blurred pattern, or data trace, due to motion blur of the optical transmitter within the image. These patterns formed in the collected images are similar to the motion induced blurring of vehicle headlights in an image due to a vehicle moving through different pixels of an image during the time it takes an imaging device to integrate the image frame. These data traces may then be identified and decoded to obtain one or more bit stream segments transmitted by the one or more optical transmitters as described herein to facilitate the transmission of data between one or more optical transmitters and a corresponding imaging device.

In one embodiment, one or more images of one or more optical transmitters may be collected with an imaging device while the imaging device and the one or more optical transmitters are in motion relative to each other. The one or more optical transmitters may transmit one or more bit stream segments as a pattern of sequential modulation cycles of a corresponding light source of each optical transmitter. The relative motion of the one or more optical transmitters and the imaging device may be sufficiently fast within a field of view of the imaging device, and an image integration time of the imaging device may be sufficiently long, such that the bit stream segments transmitted by the one or more optical transmitters may be captured as one or more data traces in the one or more images collected by the imaging device. This may permit the individual bits contained in the sequential modulation cycles of the one or more optical transmitters to be captured in separate pixels, or groupings of pixels, along a length of these data traces. Once the one or more bit stream segments have been captured as data traces in one or more images, the data traces may be identified in any appropriate manner as described further below. The identified data traces may then be decoded from a spatial domain in the images to obtain the one or more bit stream segments transmitted to the imaging device prior to storing the bit stream segments for subsequent use and/or executing any computer executable instructions included in the bit stream segments.

As used with the various embodiments disclosed herein, a data trace may refer to a line captured in an image taken by an imaging device corresponding to the blurred path of an optical transmitter across a field of view of the imaging device. It should be understood that the line of the data trace may have any appropriate shape, including, but not limited to, linear, curved, circular, wave patterns, combinations of the foregoing, and/or any other appropriate shape as the disclosure is not limited to the particular pattern captured within an image for the various data traces. Depending on the particular size of an optical transmitter within a field of view of an imaging device, a speed of the relative motion, and a length of a data stream being transmitted, in some embodiments, a data trace may be an elongated pattern that is substantially longer than it is wide within an image it is captured in.

As also used with the various embodiments disclosed herein, a modulation cycle of an optical transmitter may refer to any cycle over a predetermined duration during which an output from the optical transmitter either changes and/or remains the same to indicate a state of the optical transmitter. For example, changes in relative signal intensity, color, hue, contrast, and/or any other appropriate output may be used to provide a modulation cycle of the optical transmitter. In one specific embodiment, a modulation cycle may correspond to a full ON/OFF cycle of an optical transmitter.

It should be understood that the relative motion described in the various embodiments disclosed herein between one or more optical transmitters and an imaging device may correspond to either translational and/or rotational motion in one or more directions relative to each other. For example, an imaging device may be rotated to move the relative position of an optical transmitter within a field of view of the imaging device. Depending on the distance between an optical transmitter and an imaging device, the imaging device may also be translated at least partially in a direction that is perpendicular to an imaginary axis extending between the optical transmitter and the imaging device (e.g. left and right or up and down) to move the optical transmitter within a field of view of the imaging device. Of course, while the imaging device is described as being moved above, embodiments in which the one or more optical transmitters are moved while the imaging device is stationary as well as embodiments in which both the one or more optical transmitters and the imaging device are moved are also contemplated. For example, one or more optical transmitters may be translated within a field of view of an imaging device in linear, circular, curved, and/or any other desired movement pattern. In one such embodiment, an optical transmitter may be attached radially outwards to a rotating shaft or other structure such that the optical transmitter moves in a circular pattern during data transmission. Depending on the particular embodiment, the relative motions described above may be due to motion induced by a user holding, or otherwise interacting with, an optical transmitter and/or imaging device. However, embodiments in which the relative motion is provided by one or more motors, or other drive system, associated with an optical transmitter and/or imaging device are also contemplated. In one such embodiment, an imaging device may be vibrated to induce the desired motion using a haptic actuator such as an eccentric rotating mass, linear resonant actuator, piezoelectric actuator, and/or other appropriate actuator to induce vibrations in the device. In either case, regardless of the specific form, or method of providing the relative motion, the one or more optical transmitters may move within a field of view of the imaging device during bit stream transmission and acquisition by an optical communication system.

It should be understood that the imaging devices described herein, which may function as receivers in an optical communication system, may be any appropriate imaging device for collecting images of one or more optical transmitters during movement. For example, appropriate imaging devices may include, but are not limited to, CCD cameras, CMOS cameras, and/or any other appropriate photosensitive detector including an array of photosensitive pixels capable of capturing a data trace of an optical transmitter within a field of view of the imaging device while the imaging device and optical transmitter are in motion relative to each other.

An imaging device may have any appropriate frame rate. For example, in some embodiments, the frame rate of an imaging device may be greater than or equal to about 10 frames per second (fps), 20 fps, 50 fps, 100 fps, 240 fps, 500 fps, and/or any other appropriate frame rate. For example appropriate frame rates may be between about 10 fps and 500 fps as well as frame rates which are typical for mobile device cameras with frame rates between about 10 fps and 240 fps. However, due to the expectation that frame rates will continue to increase in various imaging devices, embodiments in which frame rates greater than, or less than, the disclosed frame rates described above are also contemplated as the disclosure is not so limited.

An imaging device may also have any appropriate pixel resolution with a corresponding array arrangement of the pixels for an intended application. For example, in one embodiment, an imaging device may have a pixel resolution greater than or equal to about 0.2 Megapixels (MP), 0.3 MP, 0.5 MP, 1.0 MP, 2.0 MP, and/or any other appropriate pixel resolution. The pixel resolution may also be less than or equal to about 10 MP, 5 MP, 2 MP, and/or any other appropriate pixel resolution. Combinations of the above noted pixel resolution ranges are contemplated, including, pixel resolutions of an imaging device that are between or equal to about 0.2 MP and 10 MP. However, embodiments in which different combinations of the above noted ranges as well as pixel resolutions both greater than, or less than, those noted above are also contemplated.

Depending on the particular application, an imaging device may be operated to take either a single image, multiple sequential images in a burst, panoramic imaging, and/or continuous images for bit stream acquisition. For example, in one embodiment, when triggered for bit stream acquisition, an imaging device may take a predetermined number of images. Alternatively, once triggered, the imaging device may continue to collect sequential images until the data transmission is terminated by a user and/or a predetermined termination signal is received either in the transmitted bit stream and/or from a separately received signal. In yet another embodiment, a panoramic image may be taken using a mobile device, or another imaging device capable of taking panoramic images. In such an embodiment, the imaging device may stitch together a view of a scene including one or more emitters without motion blur, but the individual frames used to create the panoramic view may be analyzed to detect data traces which may be decoded and used to superimpose information into the panoramic image in the form of an augmented reality icon(s) and/or/ content associated with real portions of the image. In addition, the user may then have the ability to navigate information about an environment that is spatially dense by utilizing an augmented reality overlay of the environment. In yet another embodiment, the relative motion between an optical transmitter and imaging device may be captured using composite images formed from multiple images. For example, to help generate longer data traces, the image intensities may be reduced by an appropriate factor (e.g. by a factor equal to the inverse of the number of images in some embodiments), and the images may then be added to a composite image where the intensity value of each pixel is an accumulated value of that pixel in each of the images. The composite image may thus have any desired exposure time based on the number of images used without impacting the collection of images during various imaging modes such as a video mode of a device. However, regardless of the specific imaging method used, an imaging device may collect an appropriate number of images in any appropriate manner for the particular application and expected form of data transmission.

To help facilitate capture of a blurred image where a signal from an optical transmitter forms a data trace in a collected image, it may be desirable to set an integration time of an imaging device to be a relatively high percentage of a corresponding frame duration of the imaging device. For example, an integration duration may be set to be as high a portion of a frame duration as possible to maximize the number of bits from a bit stream captured in an image while still providing sufficient time for readout of the individual pixels of the imaging device. In some embodiments, the integration time of an imaging device may be greater than or equal to 90%, 95%, and/or any other appropriate percentage of a frame duration of the imaging device. Correspondingly, the integration time of the imaging device may be less than or equal to 99.99%, 95%, and/or any other appropriate percentage of the frame duration. Combinations of these ranges are contemplated including integration times that are between or equal to 90% and 99.99% of a frame duration of an imaging device. However, it should be understood that embodiments in which different combinations of the above noted ranges as well as integration times that are greater than, or less than, those noted above are also contemplated. Further, in instances where one or more bits of a bit stream are not recorded during successive images of an imaging device, the errors in the decoded bit stream may be compensated for using a number of techniques for ensuring the accuracy of transmitted data.

An imaging device may be triggered to collect one or more images for data transmission using the methods disclosed herein in any appropriate manner. In one such embodiment, a user may simply provide an input using an input device such as a touchscreen, keypad, button, and/or other appropriate input to indicate that data transmission and/or acquisition is desired. In another embodiment, operation of the imaging device may be triggered due to the detection of movement of the imaging device greater than a preset threshold and/or due to the detection of a particular gesture based at least partly on a signal received from one or more motion sensors such as an inertial monitoring unit, an accelerometer, a magnetometer, a gyroscope, and/or any other appropriate sensor. For example, in one embodiment, a user's interaction with a mobile device such as a phone and/or a physical movement of the device by the user may trigger operation of an associated imaging device for optical communication. While several possible methods for triggering operation of an imaging device are described above, it should be understood that any appropriate method for triggering operation of an imaging device for optical communication may be used as the disclosure is not limited to only the disclosed triggering methods The optical transmitters described herein may correspond to any appropriate device capable of transmitting an optical signal including a desired bit stream. Optical transmitters may include light sources that may be cycled between different modulation states (e.g. ON and OFF states) at the desired operational frequencies for a given application. For example, light sources that may be used by an optical transmitter may include, but are not limited to: light emitting diodes (LEDs); laser diodes; any light source with a liquid crystal film disposed on its face, electrophoretic color change materials; other materials with selective reflective and/or color change properties; and/or any other material and/or device capable of modulating between two or more states to transmit data optically. These optical transmitters and their associated light sources may be provided in any appropriate form factor. For example, dedicated transmitters may be provided which simply correspond to a light source and associated controller used for transmitting a bit stream including one or more bit stream segments. Alternatively, an optical transmitter may be incorporated into a number of different form factors, including fibers and/or fabrics with embedded light sources, visible light sources for area lighting, individual or groups of pixels in a display screen, structures and devices with attached light sources, and/or any other appropriate application and/or form factor as the disclosure is not limited as to where or how the optical transmitters for an optical communication system are positioned.

Depending on the particular application, an optical transmitter may transmit data at any appropriate frequency for reception by a corresponding imaging device. Possible transmission frequencies may include, but are not limited to, 100 Hz, 200 Hz, 400 Hz, 1 kHz, 5 kHz, and/or any other appropriate frequency. The transmission frequency of an optical transmitter may also be less than or equal to about 20 kHz, 10 kHz, 5 kHz, 1 kHz, and/or any other appropriate frequency. Typically flicker in the visible spectrum is not observable by humans above about 400 Hz. Additionally, motion blur of an optical transmitter within the field of view of an imaging device while capturing separate discrete modulation cycles of the optical transmitter may be enhanced at frequencies less than about 10 kHz to 20 kHz. Accordingly, in some embodiments, a transmission frequency of an optical transmitter in the various embodiments described herein may be between about 400 Hz and 20 kHz or 400 Hz and 10 kHz. However, depending on: the particular pixel resolution of an imaging device being used; a relative size of an optical transmitter within a field of view of an imaging device; a transmission frequency of a bit stream; a speed of the relative motion between an optical transmitter and imaging device; and other appropriate operating parameters, operating frequencies for an optical transmitter both greater than and less than those noted above are also contemplated as the disclosure is not limited to any particular frequency at which data is transmitted. Further, in some embodiments, an optical transmitter may transmit data at multiple frequencies where the optical transmitter may sequentially transmit a bit stream multiple times at multiple different transmission frequencies to allow for detection of the bit stream by imaging devices with different motion velocities relative to the optical transmitter.

The ability of an optical communication system to capture a bit stream segment as a data trace within an image may be related to the ability of an imaging device to capture separate sequential modulation cycles of an optical transmitter in separate pixels, or groups of pixels, along a length of a data trace. Accordingly, when an optical transmitter occupies a relatively large portion of a field of view of an imaging device and/or when relatively slow relative motions are applied, it is possible that sequential modulation cycles of the optical transmitter could be captured in the same pixels which may hamper the ability to accurately transmit information from an optical transmitter to an imaging device. Thus, in some embodiments, it may be desirable for the optical transmitters described herein to use light sources that approximate point sources and/or simply occupy relatively small portions of a field of view of an imaging device due to their size and distance relative to the imaging device. In one embodiment, a size of an optical transmitter within a field of view of an imaging device during bit stream transmission and image collection may be at least one pixel, and in some embodiments at least two to four pixels, based on the encoding scheme as well as the speed, angular spread, and/or other appropriate operating parameters. Accordingly, in some instances a size of the optical transmitter within a field of view of an imaging device may be greater than or equal to 0.001%, 0.01%, 0.1%, 1.0% or any other appropriate percentage of a field of view of the imaging device. Correspondingly, a size of the optical transmitter within the field of view of the imaging device during bit stream transmission and image collection may be less than or equal to 5.0%, 2.5%, 1.0%, 0.1%, or any other appropriate percentage of a field of view of the imaging device. Combinations of the above ranges are contemplated, including, for example, a size of the optical transmitter within the field of view of the imaging device may be between at least one pixel and 5.0% of the field of view of the imaging device during bit stream transmission and image collection. Of course, it should be understood that an optical transmitter used in the optical communication systems and methods described herein may also occupy a portion of a field of view of an imaging device that is greater than those noted above as the disclosure is not limited in this manner.

As noted previously, prior communication methods such as the rolling shutter method typically try to occupy as much of a field of view of an imaging device as possible during data transmission to increase the amount of rows available for data transmission and/or to avoid errors induced by relative motion of an optical transmitter and an imaging device. Accordingly, when the one or more optical transmitters occupy a relatively small portion of a field view of an imaging device including, for example, less than or equal to 5% of a field of view of an imaging device, the number of rows available for data transmission are significantly reduced. Correspondingly, the data transmission rate using rolling shutter is correspondingly reduced. For instance prior methods, such as rolling shutter communication systems, may have data transmission rates that are less than or equal to about 11 bits per second (bps) when the optical transmitters occupy less than about 600 pixels of a field of view of a corresponding imaging device. This data transmission rate may be further reduced, and/or impossible, as the optical transmitters are moved further away from an imaging device, made smaller, and/or during relative motion for reasons previously described.

In view of the above, the communication methods and systems disclosed herein may offer significant advantages in regards to the possible data transmission rates during relative motion of one or more optical transmitters and a corresponding imaging device. In such an embodiment, each of the one or more optical transmitters, and/or a combined total of the one or more optical transmitters, may occupy less than about 5%, 2%, or 1% of a field of view of the imaging device during data transmission. In one such embodiment, an imaging device may collect one or more images of the one or more optical transmitters during relative motion of the imaging device and the one or more optical transmitters. The rate of data transmission from the one or more optical transmitters to the imaging device may be greater than or equal to 2 kilobits per second (kbps), 5 kbps, 10 kbps, and/or any other appropriate data transmission rate. The data transmission rate from the one or more optical transmitters to the imaging device may also be less than or equal to about 20 kbps, 10 kbps, 5 kbps, and/or any other appropriate data transmission rate. Combinations of the above ranges are contemplated, including, for example, a data transmission rate that is between or equal to 2 kbps and 20 kbps. However, data transmission rates both greater than and less than those noted above, as well as other combinations of the above noted ranges, are also contemplated as the disclosure is not limited in this fashion.

The optical communication systems described herein may operate using any appropriate ranges of electromagnetic radiation. For example, the optical transmitters described herein may include light sources that are configured to emit electromagnetic radiation with wavelengths in the ultraviolet, visible, and/or infrared spectrums. A corresponding imaging device may also be configured to detect electromagnetic radiation in the ranges emitted from the one or more light sources of one or more optical transmitters. Thus, the disclosed imaging devices may be configured to detect electromagnetic radiation with wavelengths in the ultraviolet, visible, and/or infrared spectrums as well. Therefore, it should be understood that the current disclosure is not limited to operating in any specific range of wavelengths.

The optical communication methods and systems described herein may be used in a number of different applications. For example, optical transmitters may be embedded in fibers used in textiles to communicate digital data that can be read by a smartphone camera or other imaging device. In one possible application of such an embodiment, participants in a race may wear jerseys including integrated LED point sources that are operated to transmit bit streams. Thus, observers standing on the side of the road may hold their cameras still while the racers move past the screen. The camera would then capture the transmitted bit streams which may be used to connect the phone to relevant information about the racer. LEDs embedded into clothing may also enable gesture based communications. For instance, a point source LED incorporated into clothing, or an object worn on the body, may be moved relative to a stationary camera to communicate who an individual is and/or to communicate what the individual wants using gesture recognition. In other embodiments, an optical transmitter may be incorporated into a moving object which may permit velocity, direction, and data information related to the object to be captured simultaneously by an imaging device.

In another embodiment, in a triage environment, or other environment with multiple targets (i.e. objects or individuals associated with optical transmitters), the disclosed optical communication systems may be used to quickly identify and communicate information related to the multiple targets to a particular user. In one such embodiment, a doctor, or other individual, could wave a smartphone camera across a field of view and simultaneously collect information about all optical transmitters in that field of view to obtain, for example, patient information.

In yet another embodiment, the disclosed optical communication systems may be used for optical pairing of devices where the disclosed methods may be used to identify one or more devices including an optical transmitter in a crowded environment where the transmitted data may be used to create a blue tooth, or other wireless, connection between the one or more devices and a mobile device. For example, connection information may be transmitted by an optical transmitter associated with a wireless device to an imaging device associated with a second wireless device which may then wirelessly connect to the first device using the transmitted connection information.

In still another embodiment, in an unpredictable, unfamiliar, and/or spatially dense environment the disclosed optical communication systems and methods may be used to enable two unknown entities to communicate information as it becomes relevant. For example, at an airport, gate changes and plane arrivals utilize frequent and direct communication between incoming aircraft and on the ground crew where the ground crew may communicate information directly to the aircraft as it becomes available. In another embodiment, an optical communication system may be used to communicate advertisements and/or other information using, for example, the lighting infrastructure inside of restaurants, streets, highways, and/or other locations. This infrastructure may thus act as beacons for data storage and data transmission to users in both passive and/or on-demand scenarios. For instance, a pedestrian walking down a street may simply hold their phone, scan the area, and receive targeted advertisements and information about the area that they are in.

The disclosed communication methods and system may also be used to enable other new ways to communicate information. For example, information may be passively communicated to cars regarding traffic patterns, nearby human activity, and/or other information that may otherwise be hard to program for. In other embodiments, the disclosed optical communication system may be integrated into existing architecture in cities (such as street lights) to transform these existing structures into information hubs that may enable data communication for a variety of applications including, for example, autonomous vehicles used in public transportation. In such an application information may be sent/received in real-time while the vehicle is in motion and while being accurate relative to a position of the vehicle (e.g. a user could make a handshake with an approaching autonomous vehicle by waving a phone at the car which may inform the car regarding exactly where to stop. The car could then communicate with a separate remotely located server, or other computing device, though a street light, or other system, its location and destination, thereby enabling a futuristic connected city.

Other possible uses the disclosed optical communication systems and methods may be used for may include multi-source recognition, mobile payments (e.g. waving a phone at a transmitting light source to purchase a ticket for admission without the use of a turnstile), indoor positioning, screen to phone communication, phone to phone data transfer using the cameras and flashlight LEDs on smartphones, and any other appropriate application where data is communicated between an optical transmitter and imaging device.

The disclosed optical communication methods and systems offer multiple benefits relative to other traditional optical communication systems. Specifically, by using the relative motion of an optical transmitter and an imaging device to create a blurred image with bit stream segments captured in one or more data traces, the temporally encoded blink pattern of the optical transmitter is mapped onto the spatial domain of the imaging device. This may result in an enhanced signal to noise ratio due to the background pattern being blurred within the image which may help to suppress the signal noise. The blurring of the immediate region surrounding the data trace in an image may also permit the use of standard blur-detection image processing techniques to identify the data traces within an image. Thus, the disclosed methods and systems use relative motion to enhance data transfer while prior systems and methods either eliminate relative motion and/or use computationally expensive algorithms to mitigate distortions from this relative movement. Accordingly, in some applications, the disclosed systems and methods may offer enhanced data transmission frequencies while also reducing, or eliminating, observable flicker without the use of computationally expensive object tracking and/or blur mitigation algorithms.

The disclosed systems and methods may also enable the simultaneous transmission of data from multiple optical transmitters to a single imaging device while providing for either discrete and/or continuous data transmission and acquisition. For example, unlike prior system which are limited to transmitting single data streams at a time, the disclosed systems and methods may be used for transmitting multiple data streams to a single imaging device simultaneously. This capability may be applicable in a mixed and/or augmented reality application where multiple data streams related to various types and sources of information may be integrated simultaneously. In addition, utilizing the disclosed methods and systems may enable the use of cellular smartphones, or other devices, to share information in an augmented reality, and/or mixed reality, experience using technologies like a Hololens where multiple data streams related to various types and sources of information may be transmitted to, and received simultaneously, by a device.

Depending on the particular embodiment, the optical communication methods described herein may be implemented in a number of ways. For example, in one embodiment, an optical communication system may include one or more processors that are configured to implement any of the methods described herein. Additionally, the embodiments described herein may be implemented as a computer implemented method and/or the disclosed optical communication methods may be stored in at least one non-transitory computer-readable storage medium as processor executable instructions that may be executed by at least one processor to perform the described methods.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1B:
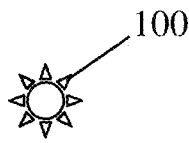
FIG. 1B is a schematic representation of the optical transmitter of FIG. 1A in an ON state emitting light.

FIGS. 1A and 1B depict one embodiment of an optical transmitter. In FIG. 1A, the optical transmitter is in an OFF state in which light is not emitted from the optical transmitter. FIG. 1B depicts the optical transmitter in the ON state in which light is emitted from the optical transmitter. As noted previously, the optical transmitter may be cycled between the ON and OFF states, or other types of modulation states, to form a blinking pattern in a time domain corresponding to one or more bit stream segments that are to be optically transmitted by the optical transmitter.

Figure 2:
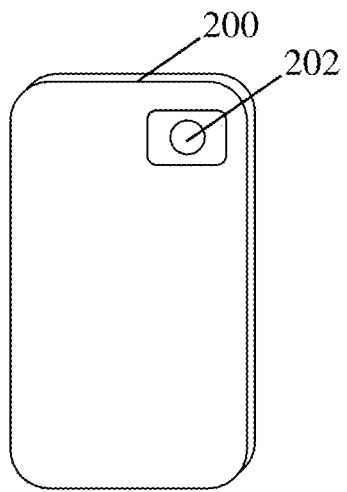
FIG. 2 is a schematic representation of one embodiment of an imaging device.
Figure 3:
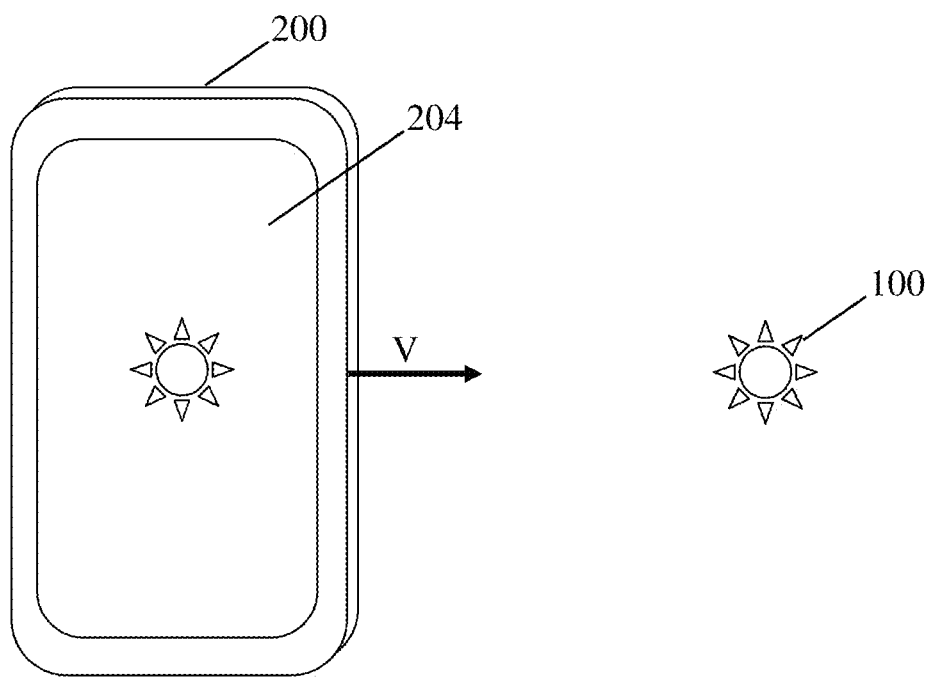
FIG. 3 is a schematic representation of the imaging device of FIG. 2 being moved relative to an optical transmitter during image collection.

FIG. 2 depicts one embodiment of an imaging device 200 including a photosensitive detector 202. In the specific embodiment depicted in the figure, the imaging device corresponds to a mobile phone and the photosensitive detector is a CMOS camera incorporated into the mobile phone. However, as noted previously, the imaging device may be provided in any number of different form factors as the disclosure is not limited to any particular application. FIG. 3 depicts the imaging device 200 being moved in a desired direction with a velocity V relative to an optical transmitter 100. As illustrated by the image of the optical transmitter on a screen 204 of the imaging device, the imaging device may collect one or more images of the optical transmitter during this relative movement. As described in more detail below, this may facilitate the transfer and acquisition of one or more bit stream segments between the optical transmitter and the imaging device. Specifically, motion blur of the blink pattern of the optical transmitter may be captured as a data trace in one or more images collected by the imaging device.

Figure 4A:
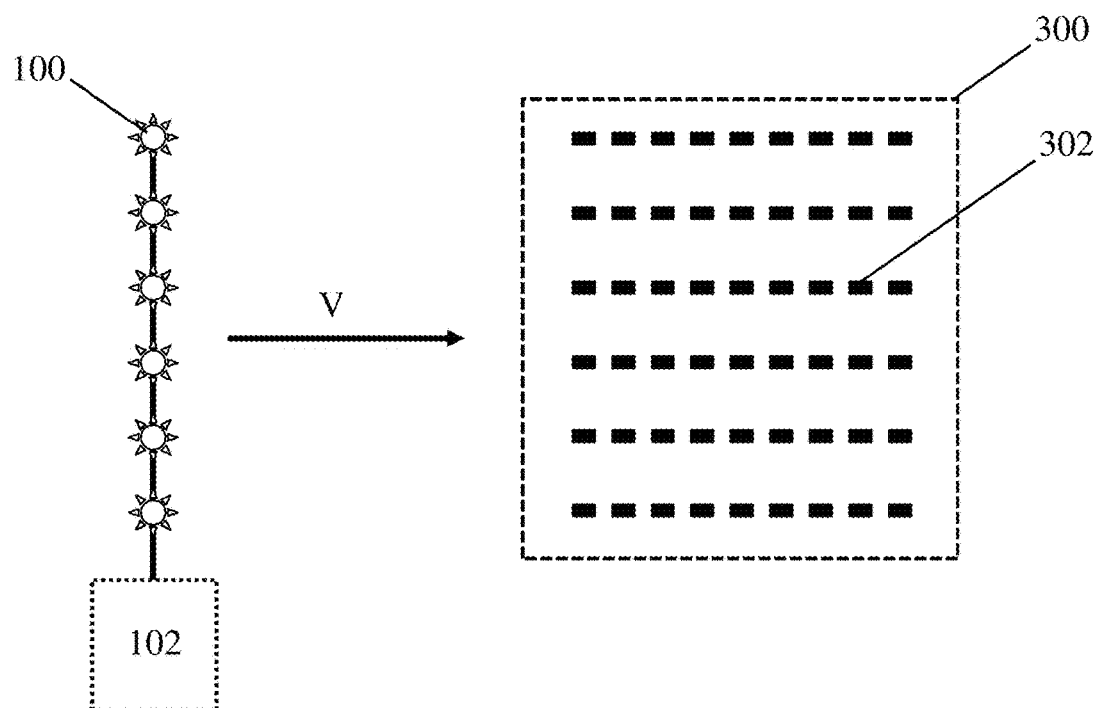
FIG. 4A is a schematic representation of multiple optical transmitters transmitting bit stream segments and the corresponding data traces captured in an image during linear relative movement of an imaging device and the optical transmitters.

FIG. 4A illustrates one embodiment of an optical communication system where a plurality of optical transmitters 100 are coupled to an associated controller 102 to transmit a blink pattern of sequential modulation states associated with one or more bit stream segments. The individual optical transmitters may either transmit the same bit stream segments, different segments of the same overall bit stream, and/or multiple different bit streams as the disclosure is not limited in this fashion. As described above in relation to FIG. 3, a corresponding imaging device may be moved relative to the plurality of optical transmitters while collecting one or more images 300. Using an appropriate transmission frequency and relative movement velocity, the one or more images may capture one or more data traces 302 corresponding to the transmitted bit stream segments within a field of view of the imaging device. These data traces may correspond to the individual modulation states of the separate optical transmitters being captured in individual pixels, or groupings of pixels, of the image. This motion blurring of the blink pattern of the optical transmitters is due to the optical transmitters moving within the field of view of the imaging device during image integration. Thus, the sequential modulation cycles of the optical transmitter may be recorded in the pixels of the one or more images along a length of the captured data traces. For example, in some embodiments, areas of increased signal intensity within the data traces may correspond to an ON state of the optical transmitters while areas of decreased signal intensity within the data traces may correspond to an OFF state of the optical transmitters. However, other encoding methods for the modulation states of the signal may also be used. In either case, these patterns may be identified and decoded using methods described further below.

Figure 4B:
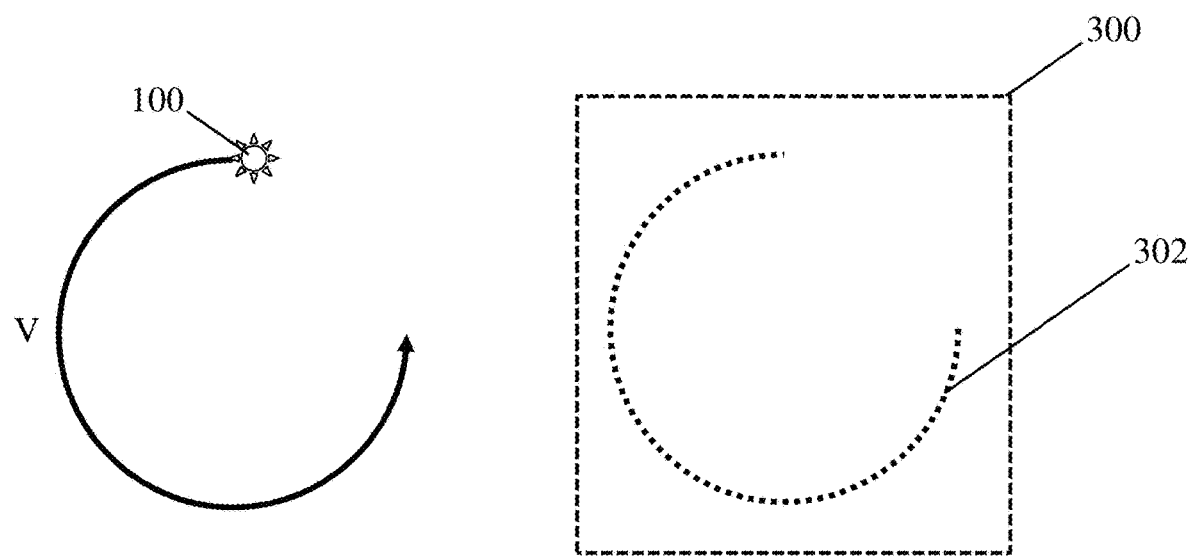
FIG. 4B is a schematic representation of an optical transmitter transmitting bit stream segments and the corresponding circular trace captured in an image during rotational movement of the optical transmitter within a field of view of the imaging device.

Similar to FIG. 4A above, an embodiment in which an optical transmitter 100 is moved along a rotational path within a field of view of an imaging device is shown in FIG. 4B. In the depicted embodiment, the imaging device may again collect one or more images 300 that may include one or more data traces 302 captured within the one or more images. In one such embodiment, the image capture time, i.e. frame duration, and rotational speed of the optical transmitter may be selected such that a path of the optical transmitter may be captured in the image while maintaining a path covered by the optical transmitter to be less than or equal to a single rotation about its rotational axis. For example, if the optical transmitter traverses more than a single rotation within a single image, it could overwrite some of the data contained in the captured data trace. Accordingly, in some embodiments, to enable the capture of as much data as possible in a single frame, the frame duration for capturing an image may be set as large as possible in the image while avoiding the optical transmitter traversing more than a full rotation within the field of view of the imaging device during a frame capture which would overwrite some of the transmitted data.

In some embodiments, blur may be present in large portions of the background of an image. For example, when an imaging device is in motion relative to an optical transmitter and the background, a majority of a captured image may be blurry. However, in embodiments where the one or more optical transmitters are in motion and the imaging device is stationary, a background of the image may be mostly in focus due to many of the objects within a field of view of the imaging device being stationary as well. Thus, the image may not contain many blurry regions within the image. Accordingly, in some embodiments, it may be desirable to simplify the processing and analysis for identifying one or more data traces contained within the image. In such an environment, a background of the one or more images may be removed to facilitate identification of the one or more data traces contained therein. As detailed further below, this may include, for example, using at least a second image to remove the background from a first image prior to further processing and analysis of the resulting image. Removing the background from an image for further analysis may simplify the identification and decoding of the one or more data traces contained within an image. Additionally, such a process may also help to reduce noise introduced into the transmitted signal through the reduction of ambient light noise within the image as well, which may be a significant advantage as compared to typical transmission schemes such as the rolling shutter method which is sensitive to ambient light noise.

Figure 5A:
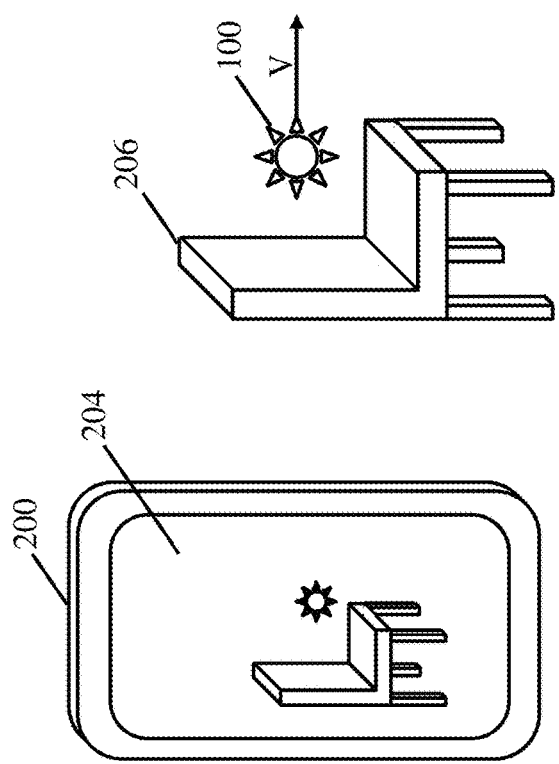
FIG. 5A is a schematic representation of one embodiment of an optical transmitter moving relative to an imaging device.

FIG. 5A depicts an arrangement similar to FIG. 3 above. However, in the depicted embodiment, an imaging device 200 is held stationary while an optical transmitter 100 is moved within a field of view of the imaging device with a velocity V as shown by the image of the optical transmitter on a screen 204 of the imaging device. Again, the motion of the optical transmitter relative to the imaging device may follow any appropriate path as the disclosure is not limited to any particular type of relative motion between the optical transmitter and the imaging device. In addition to the one or more optical transmitters contained within the field of view of the imaging device, as noted above, a background of the image may be mostly stationary relative to the imaging device during image capture in this particular embodiment. This is illustrated by the inclusion of an object such as a stationary chair 206 located within the field of view of the imaging device.

Figure 5B:
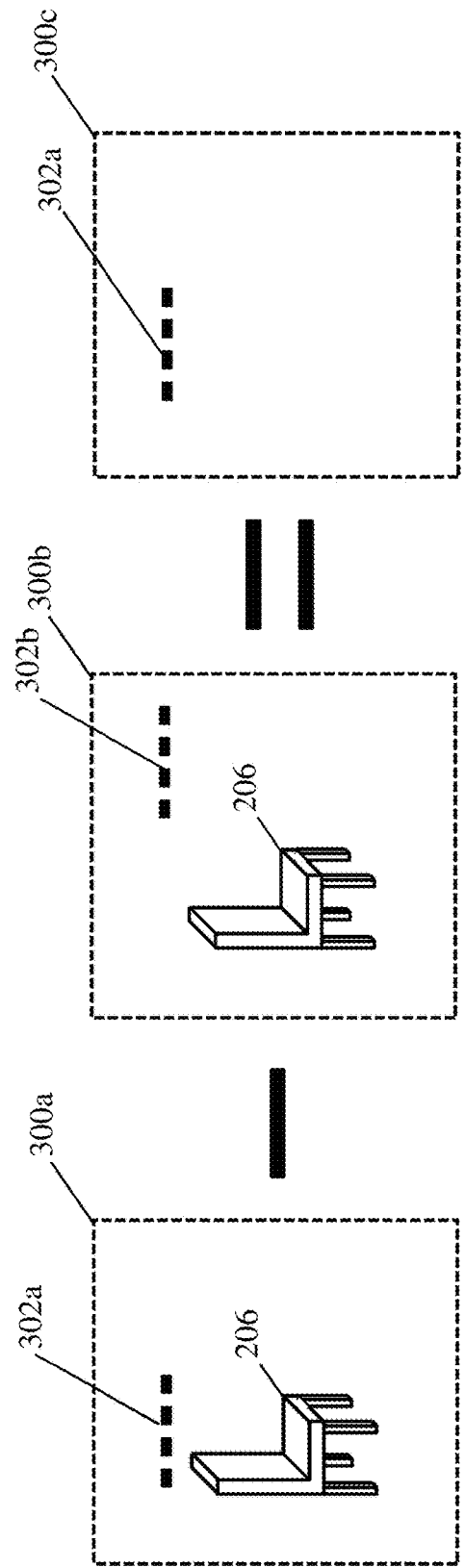
FIG. 5B is a schematic representation of one embodiment of an image processing method for removing background features, such as in focus stationary objects, captured in an image taken by the imaging device of FIG. 5A during motion of the optical transmitter.

FIG. 5B illustrates one possible embodiment for removing a background from one or more images captured by an imaging device during data transmission. In the depicted embodiment, a series of sequential images may include at least a first image 300a and a second image 300b. Each image may include a mostly stationary background, for example a majority of the background may be stationary, and the background may be in focus as shown by the stationary chair 206 present in each image. Of course, it should be understood that other objects, surfaces, and/or any other appropriate feature that might be present within a background of an image may also be present as the disclosure is not limited to what is in the background of an image. As described previously, the modulation cycles of the one or more optical transmitters may be captured in the one or more images as one or more data traces illustrated by a first data trace 302a captured in the first image and a second data trace 302b captured in the second image at a subsequent time point. Due to the difference in times when these data traces were captured, the data traces are located in separate sequential portions of the images.

Due to the imaging device and the backgrounds being substantially stationary relative to each other during capture of the sequential images 300a and 300b, the features within the background, including, for example, the chair 206, may be located in substantially the same relative positions and may be captured with substantially similar magnitudes, saturations, hues, and/or any other appropriate characterization parameter. Accordingly, the background of the second image may be used to remove the background of the first image. In one possible implementation, the second image may simply be subtracted from the first image as shown in the figure to provide a third image 300c including one or more data traces (e.g. the first data trace 300a from the first image being processed), with the background of the images substantially removed. For example, the one or more desired characterization parameters of the individual pixels of the second image may be subtracted from the corresponding pixels of the first image to provide a value of the one or more characterization parameters for the third image. Of course, while a simple subtraction has been illustrated in the figure, it should be understood that any appropriate method of removing the background from the images may be used. For example, a moving average for the various pixels may be used to subtract out a background from the image. The moving average may correspond to an average value of one or more characterization parameters of the various pixels taken over any appropriate number of images. In yet another embodiment, a Gaussian blur may be applied to the second image prior to subtracting the values of the one or more characterization parameters of the various pixels of the second image from the first image which may help to suppress any minor movement of the imaging device relative to the in focus background between the separate images.

Depending on how the values of the various characterization parameters of the plurality of pixels of the third image 300c are treated during removal of a background of an image, various artifacts may be present. For example, simply subtracting a value of a characterization parameter, such as intensity, of a pixel in the second image 300b from a corresponding pixel in the first image 300a may result in a negative value in some instances. In such an instance, the value may either be set to a predetermined minimum value such as, for example, zero or some other appropriate value. Alternatively, the values of the desired characterization parameters may be transformed into a magnitude using absolute value. In such an embodiment, the one or more data traces present in an image used to remove the background from another image may be present in the resulting image with the background removed. This duplication of data traces in multiple images may be handled during the identification and decoding process of the data traces. In yet another embodiment, values of a characterization parameter of the plurality of pixels less than a predetermined threshold value may simply be ignored. In view of the above, it should be understood that the background may be removed from an image using at least one other image in any appropriate fashion and that the resulting values of the one or more characterization parameters of the various pixels may be treated in any desired fashion for identification and/or data transmission purposes as the disclosure is not limited to any particular data handling method.

It should be understood that while the above embodiments are described relative to a background that is in focus within a field of view of an imaging device during data transmission, the described method may also be applied for processing of images in which the background is already blurred. In such an application, using the described process may still remove the blurred background while leaving the desired one or more data traces in the resulting image for further processing and decoding.

In some instances, the amount of data to be transmitted from an optical transmitter to an associated imaging device may be larger than may be easily accommodated on a single image frame. Accordingly, in some embodiments, an imaging device may take a predetermined number of images, and/or the imaging device may continuously collect images, of an optical transmitter within its field of view. In such an embodiment, multiple bit stream segments may be captured as a plurality of data traces located within a plurality of separate images. In such an embodiment, it may be desirable to stitch the separate images and/or bit stream segments together to form a combined image and/or bit stream.

Figure 6:
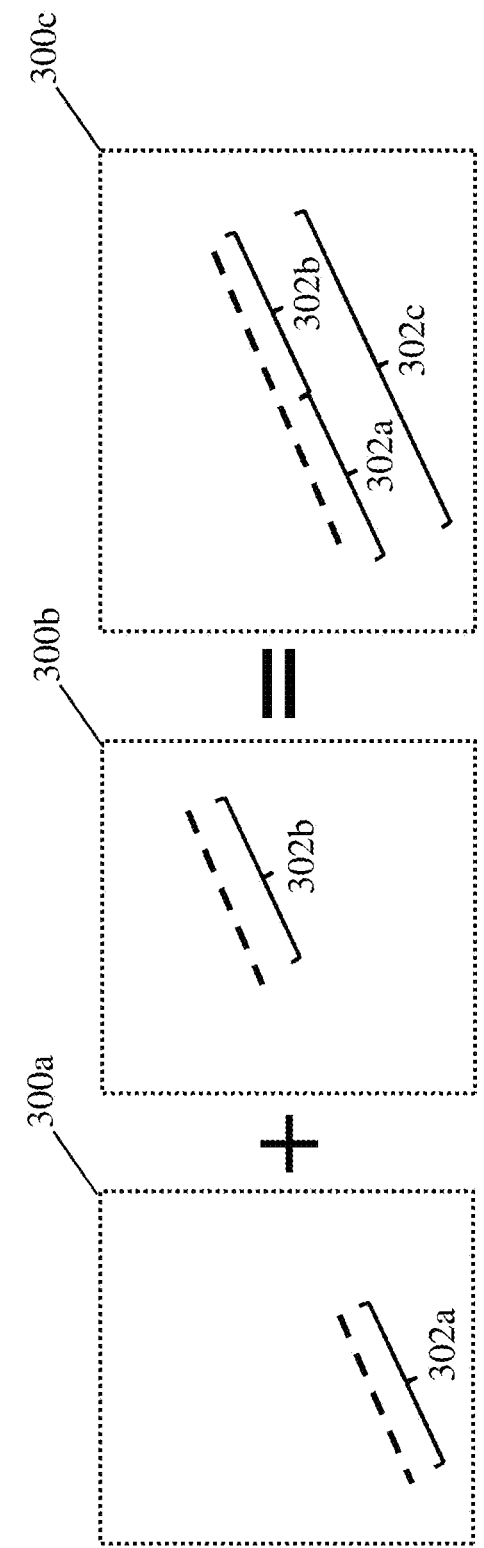
FIG. 6 is a schematic representation of stitching together multiple bit stream segments captured in multiple images.

FIG. 6 illustrates one embodiment of a stitching process where multiple data traces and/or bit stream segments are combined to form a combined data trace and/or combined bit stream. In the figure, a first image 300a includes a first data trace 302a corresponding to a first bit stream segment and a second image 300b includes a second data trace 302b corresponding to a second bit stream segment that follows the first bit stream segment. The separate bit stream segments may be combined to form a combined bit stream 300c in the combined image 300c. This combination may be done in any appropriate fashion. For example, in one embodiment, the separate bit stream segments may simply be combined after decoding. Alternatively, the separate images including the bit stream segments may be combined such that an end portion of the first data trace of the first bit stream segment is located proximate to a beginning portion of the second data trace of the second bit stream segment in the combined image. The combined image may then be analyzed and decoded to obtain the combined bit stream. While two images have been stitched together in the depicted embodiment, it should be understood that any appropriate number of images and/or bit stream segments may be combined to form a combined bit stream. Additionally, in some embodiments, gaps in the captured bit stream segments may be minimized either by setting an integration time of the camera to be equal to or as close as possible to the duration of the frame (e.g. for 30 frames per second, the duration may be about 33.3 msec), or by redundancy built into an implemented encoding scheme.

Due to variations in the relative movement between an optical transmitter and an associated imaging device during collection of a single image frame and/or during collection of separate image frames, the number of pixels corresponding to each modulation cycle of an optical transmitter within a data trace captured in an image may not be uniform. For example, relatively slower translational and/or rotational velocities may be associated with each modulation cycle being captured by a smaller number of pixels while faster translational and/or rotational velocities may be associated with each modulation cycle being captured by a larger number of pixels within a field of view of the imaging device. Accordingly, the length of each bit contained within a data trace in an image may vary along a length of the captured data trace which may complicate the decoding process of the bit stream segments. This acquisition artifact in the captured data traces is detailed further below.

Figure 7:
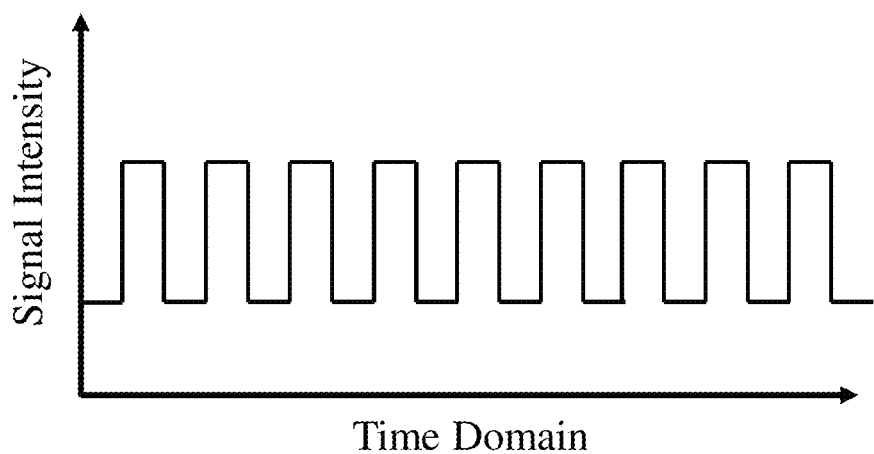
FIG. 7 is a graph of signal intensity of a bit stream transmitted by an optical transmitter in a time domain.
Figure 8:
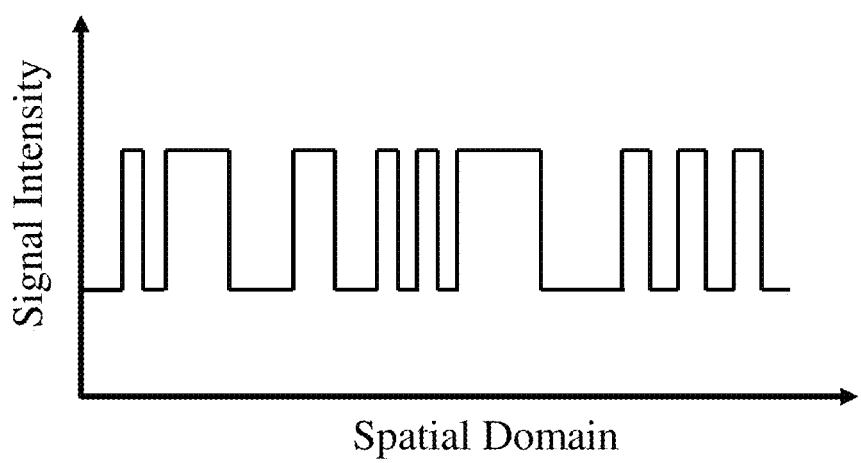
FIG. 8 is a graph of the bit stream of FIG. 7 transformed into the spatial domain of an image.

FIG. 7 depicts a bit stream signal versus time transmitted by an optical transmitter. As illustrated in the graph, each bit is transmitted over a uniform duration within the time domain with each modulation cycle of the optical transmitter having an equal duration. In contrast, FIG. 8 shows one example of a detected signal intensity along a length of a data trace captured within an image during relative movement of an imaging device and the optical transmitter. Similar to the original transmitted signal, the larger signal intensities may correspond to ON states of the optical transmitter and the smaller signal intensities may correspond to OFF states of the optical transmitter. However, the duration of each bit in the spatial domain of the image is not uniform along a length of the data trace. Again, this variation in recorded bit length within the spatial domain may be due to variations in the relative speed between the imaging device and the optical transmitter when collecting the image of the blink pattern of an optical transmitter.

Figure 9:
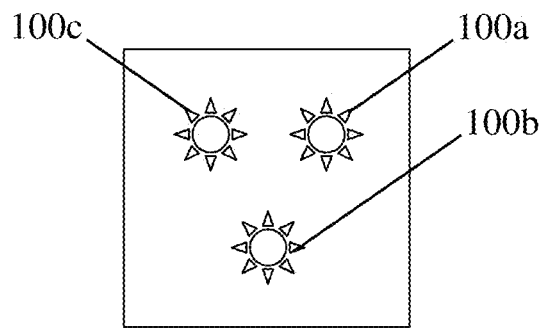
FIG. 9 is a schematic representation of one embodiment of an optical communication system including a plurality of optical transmitters for transmitting separate simultaneous signals.
Figure 10:
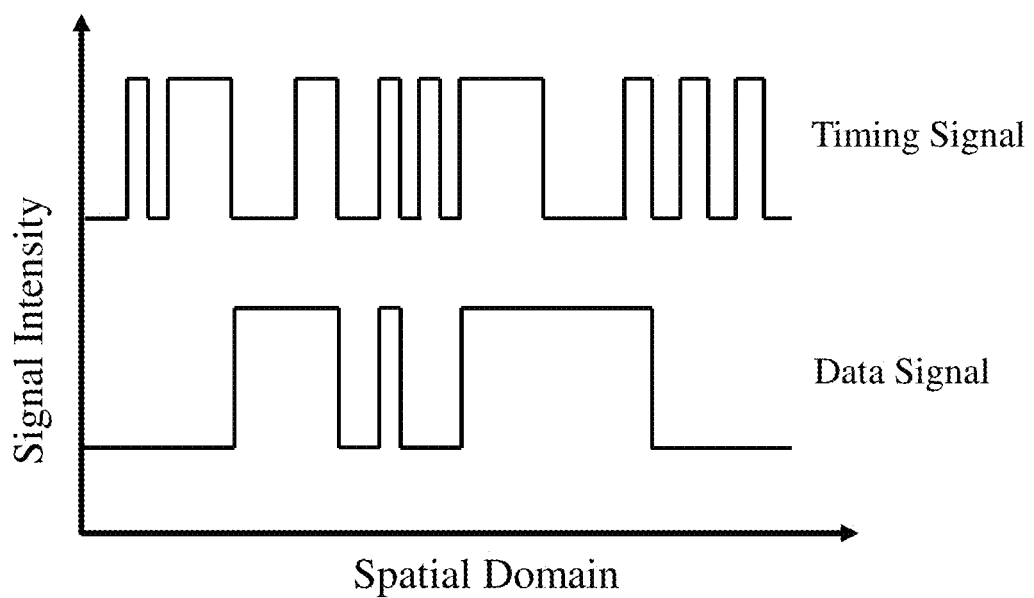
FIG. 10 is a graph of signal intensity of two data traces identified in an image including separate timing and data signals.

The above noted variation in bit length within the spatial domain of an image complicates the decoding of a bit stream segment. Accordingly, in some embodiments, a clocking signal may be included in at least one of the bit stream segments and/or a separate light source including a clocking signal may be captured in each image. The clocking signal may be used to determine a length of each sequentially recorded bit within the one or more data traces. These bit lengths within the spatial domain of the image may then be used by a decoder to read the bits contained in each of the one or more data traces in an image to obtain the bit stream segments. For example, for encoding schemes that are self-clocking, including Manchester encoding, the individual bit stream segments may include both clock and data signals which may be used to decode the data traces located in the spatial domain of the images. In other embodiments, and as shown in FIGS. 9 and 10, a separate clock signal may be transmitted using a first optical transmitter 100a and one or more data signals may be transmitted using one or more second optical transmitters 100b. The bit stream segments associated with these separate clock and data signals may be captured simultaneously as separate data traces in the spatial domain of an image collected by an associated imaging device. The clock signal in each image may then be used to decode the one or more data signals.

In view of the above, the time domain blink pattern corresponding to the transmitted bit stream segments may be viewed as being mapped onto the spatial domain of an imaging device. This may permit data to be simultaneously transmitted by separate optical transmitters while being acquired using a single imaging device. Further, for encoding schemes that are self-clocking, the decoding algorithm may be viewed as being scale invariant and may be easily applied to decode multiple bit streams transmitted at different speeds. Self-clocking coding schemes may also permit a transmitter to vary a frequency at which data is transmitted which may increase the range of relative motion between an optical transmitter and imaging device where data can be decoded. Again, this may be done without any change in the hardware of the system, and without significant changes to the transmitting and decoding software. It is also possible that in systems where a separate clocking signal is provided, the clocking signal may be used for decoding a plurality of separate data signals transmitted using a plurality of optical transmitters at the same time. In some embodiments, a clocking signal provided to decode other data signals captured within an image may correspond to a self-clocking encoding scheme, in which case, the clocking signal for the other data signals may include a separate data stream as well.

Figure 11:
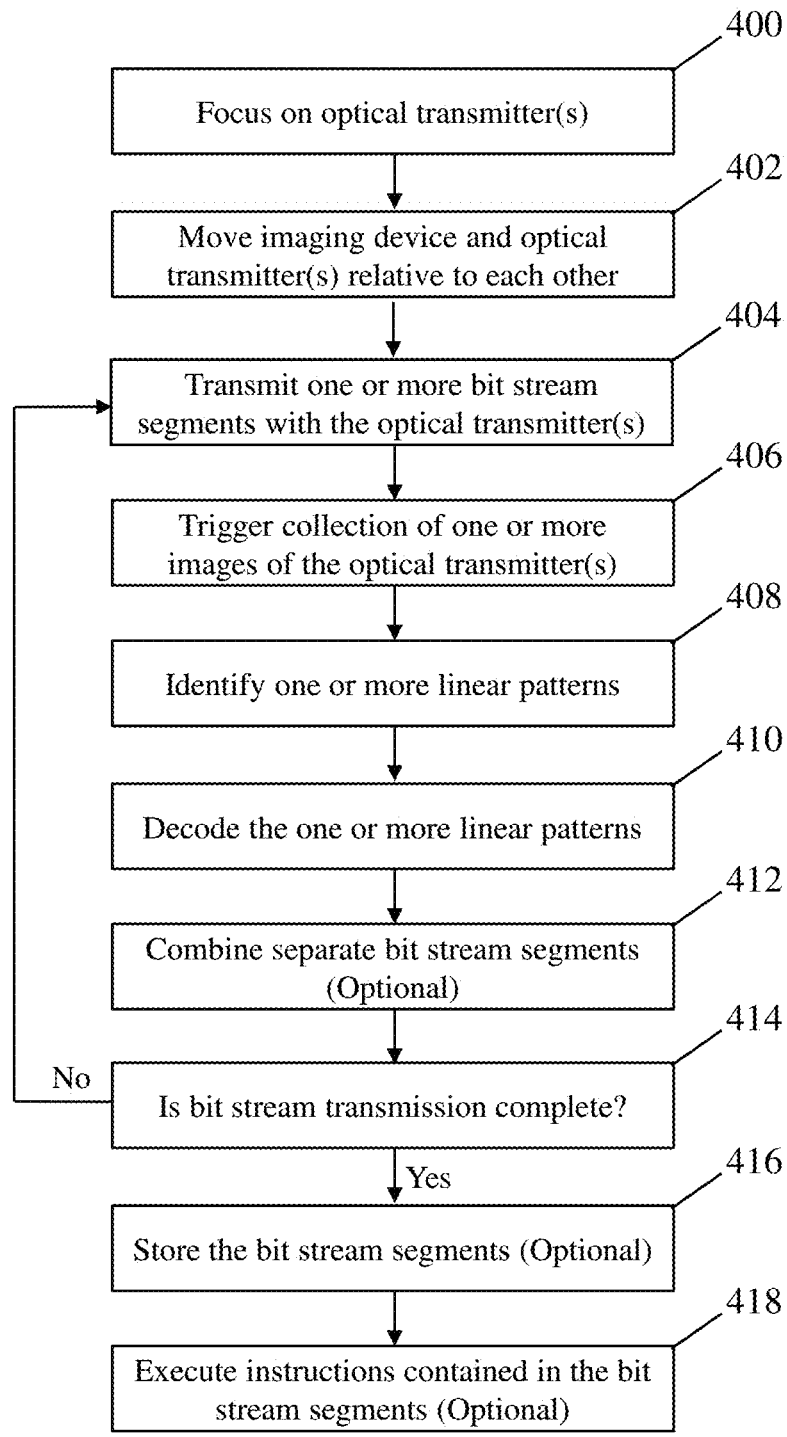
FIG. 11 is a flow diagram of one embodiment of a method for performing optical communication.
Figure 13:
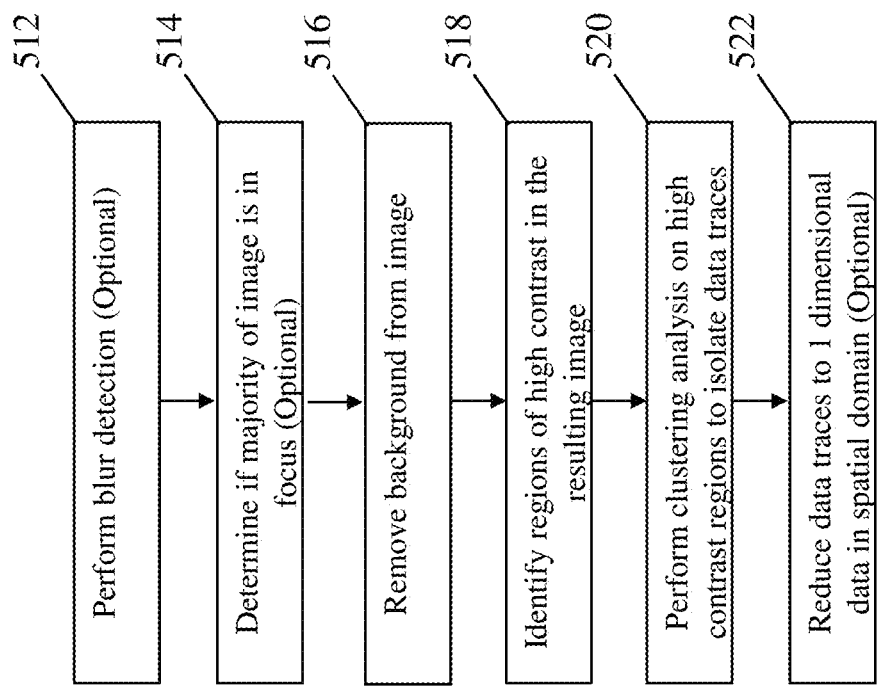
FIG. 13 is a flow diagram of one embodiment of a method for identifying data traces in an image corresponding to bit stream segments captured in the image by removing a background from the one or more images.
Figure 12:
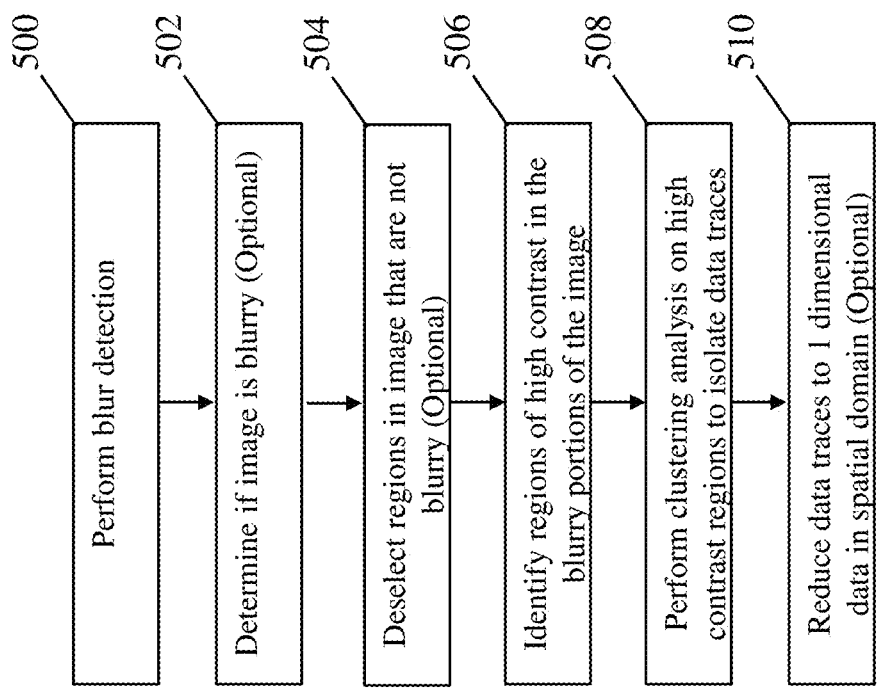
FIG. 12 is a flow diagram of one embodiment of a method for identifying data traces in an image corresponding to bit stream segments captured in the image.

Having described the general aspects related to the transmission and acquisition of bit stream segments using relative motion of an imaging device and optical transmitter, one embodiment of a specific method for implementing such an optical communication scheme is described in regards to FIGS. 11-13.

In FIG. 11, an imaging device may be focused on one or more optical transmitters at 400. To maintain the one or more optical transmitters in focus during bit stream transmission and acquisition, in some embodiments, the focus of an imaging device may remain fixed during optical communication. This may help to maintain the imaging device focused on the one or more optical transmitters during the motion applied to the imaging device and/or the one or more optical transmitters at 402. During optical communication, the one or more optical transmitters may transmit one or more bit stream segments at 404, which in some embodiments may be a blink pattern. This transmission of the bit stream segments may either occur continuously and/or may be triggered in response to a user input, a signal received from a corresponding imaging device, and/or any other appropriate form of input as the disclosure is not limited in this fashion. At 406, an imaging device may be triggered by a user input, detection of a particular motion and/or gesture, and/or any other appropriate input to begin collection of one or more images of the one or more optical transmitters. This may result in the blink patterns of the bit stream segments transmitted from the one or more optical transmitters being captured in the one or more images as one or more data traces in each image.

After collecting the images and the data traces contained therein, the data traces may be identified within the one or more images at 408. This may be done with any appropriate type of image analysis algorithm with one possible embodiment described further below. Once the one or more data traces have been identified, the data traces may be decoded at 410 as also described in more detail below. Generally though, the modulation states of the optical transmitters for the individual bits of a bit stream segment may be mapped onto the spatial domain of the one or more images as data traces. The data traces may include information such as relative signal intensity, color, hue, contrast, or any other appropriate parameter associated with the signals captured by the imaging device which may be used to determine the specific state of the one or more optical transmitters. For example, a signal intensity greater than a threshold signal intensity or average signal intensity may indicate an first modulation state, such as an ON state, and a signal intensity less than the threshold signal intensity or average signal intensity may indicate an second modulation state, such as an OFF state. Therefore, using the data traces and an associated clocking signal, which may be included in the data trace itself, or another data trace in the image, the data traces may be decoded from the spatial domain to obtain the originally transmitted bit stream segments. As noted previously, in instances where separate bit stream segments have been transmitted, the data traces and/or the decoded bit stream segments may be combined at 412. For example, successfully decoded bit stream segments may be aggregated over an entire image frame and/or over multiple image frames to form a combined bit stream. Depending on the particular implementation, bit streams from multiple image frames may be stitched together based on their relative positions as described previously above. Alternatively, multiple occurrences of particular bit stream segments captured as data traces in either a single or multiple images may be used to provide a higher confidence in their detection.

At 414, a processor associated with an imaging device may determine if bit stream transmission is complete. This may be determined using any appropriate method as the disclosure is not limited in this fashion. For example, an end of transmission sequence may be transmitted within a bit stream and/or a separate signal may be received to indicate the end of transmission. In either case, if transmission is not complete the one or more optical transmitters may continue to transmit the one or more bit stream segments and the imaging device may continue to collect images of the optical transmitters until transmission is complete. Alternatively, in some embodiments, these transmission and acquisition processes may be performed continuously. Once bit stream transmission is complete and/or a complete bit stream is received, the bit stream segments may be stored in at least one non-transitory computer-readable storage medium. The transmitted bit stream segments may be stored individually and/or they may be stored as a combined bit stream corresponding to the complete transmitted bit stream. In some embodiments, the bit stream segments may include computer executable instructions. In such an embodiment, the computer executable instructions included in the bit stream segments may be executed by one or more processors of a computing device.

FIG. 12 depicts one embodiment of a method for identifying data traces within an image corresponding to bit stream segments captured during the relative motion of an imaging device and an optical transmitter. Initially, a standard blur detection algorithm may be used to analyze the image at 500. For example, a Laplace transform of the image may be performed by a processor of an imaging device. Within the Laplace space, high average contrast values may be associated with a sharp image, while lower average contrast values may be associated with blurred images. In some embodiments, the blur detection algorithm may be used to determine if the image is at least partially blurry at 502, and thus, may indicate relative movement of the optical transmitter during image capture. If the image includes at least some portions that are blurred, further analysis may be performed. Appropriate blur detection methods may include, but are not limited to: gradient based methods such as the Gaussian derivative, Gradient energy, Absolute Gradient with Threshold, Squared Gradient, 3D Gradient, Tenegrade, and Tenegrad Variance methods; Laplacian based methods such as the Variation of LaPlacian, Energy of Laplacian, Modified Laplacian, Diagonal Laplacian, and Laplacian in 3D Window methods; wavelet based methods such as the Sum of Wavelet Coefficients, Variance of Wavelet Coefficients, Ratio of the Wavelet Coefficients, and Ratio of Curvelet Coefficients; statistics based methods such as the Chebyshev moments, Eigenvalues, Gray-level variance, Gray-level local variance, Normalized gray-level variance, modified gray-level variance, Histogram entropy, Histogram range; discrete Cosine Transform based methods such as the DCT energy ratio, DCT reduced energy ratio, and Modified DCT; Absolute central moment; Brenner's measure; Image contrast; Image curvature; Hemli and Scherer's mean; Local binary patterns; Steerable filters; Spatial frequency measure; Vollath's autocorrelation; and/or any other appropriate blur detection method. In some embodiments, portions of an image that are not blurry may optionally be deselected from the analysis at 504. For instance, if an object is stationary relative to an imaging device during image capture, that portion of the image may exhibit a first larger average contrast value relative to other portions of the image which may exhibit a second smaller average contrast value. The identification and selection of blurry portions of an image for subsequent analysis may be conducted using any appropriate method including absolute thresholding, relative thresholding, and/or any other appropriate method.

Once one or more portions of an image have been selected for analysis, these portions of the image may then be analyzed to determine regions that exhibit higher contrast relative to surrounding portions of the image at 506. For example, within the above noted Laplace space, the captured data traces in an image may exhibit relatively large Laplace values, i.e. increased contrast, as compared to the surrounding blurry portions of the image which exhibit a lower average Laplace value, i.e. lower average contrast. This may be viewed as identifying portions of an image with a lower average Laplace value, i.e. contrast, with isolated regions of increased Laplace value, i.e. contrast, within those portions of the image. Once these regions of increased contrast within a blurry portion of an image have been identified, any appropriate form of clustering analysis may be performed to isolate and identify the data traces for further analysis at 508. The clustering analysis may be configured to preferentially identify relatively long narrow strips, i.e. regions that are substantially longer in one dimension than the other within the spatial domain of the image, to isolate the data traces within the image for further analysis and decoding. The clustering analysis may be performed using any appropriate methodology including, but are not limited to, K-means clustering, mean-shift clustering, density-based spatial clustering, expectation maximization clustering, agglomerative hierarchical clustering, and/or any other appropriate clustering method as the disclosure is not so limited.

In some embodiments, the one or more isolated data traces may be reduced to a one dimensional data trace where the selected data signal (e.g. signal intensity, color, hue, contrast, or other appropriate parameter) is included as a function of the spatial coordinate within the image at 510. The one or more data traces identified within an image may be linearized by taking a linear cross section along a length of the data trace, averaging the desired data signal across a width of the identified data trace for each pixel coordinate along the data trace's length, and/or any other appropriate method for linearizing the signal contained in the one or more data traces. However, embodiments in which image processing techniques for detecting blobs are applied to the identified data traces are also contemplated. In such an embodiment, the two dimensional data included in the isolated data traces may be directly provided to a decoder instead.

While a blur detection method and analysis using a Laplace transform are described above, it should be understood that any appropriate transform function and/or blur detection method may be used to identify and isolate data traces within an image as the disclosure is not limited to any particular method for performing this type of analysis and data manipulation.

FIG. 13 depicts another embodiment of a method for identifying data traces within an image corresponding to bit stream segments captured during the relative motion of an imaging device and an optical transmitter. In this embodiment, blur detection as described above may be performed to determine whether or not an image is blurry or in focus at 512 and 514. For example, the system may determine if a majority, or some other appropriate fraction, of the image is in focus. In some embodiments, if it is determined that a majority of the background is in focus, the background may be removed from the image including one or more data traces at 516. For example, the background of the image may be removed by using the methods described above relative to FIGS. 5A and 5B where a background of at least one image is used to remove a background from another image including at least one data trace. After removing the background from one or more images, the one or more images may be processed as described above relative to FIG. 12 to identify regions of high contrast in the images with their background removed, performing clustering analysis on high contrast regions to isolate data traces, and reducing the data traces to 1 dimensional data in a spatial domain at 518-522.

While the embodiment above is described relative to determining if an image is mostly in focus prior to removing a background and for the processing of images. The disclosure is not limited to removing the background from images in which the background is in focus. For example, embodiments in which the blur detection and determination of an amount of the image being in focus is not performed prior to removing a background from an image are also contemplated. For example, the background of blurry images may also be removed prior to further processing as the disclosure is not limited in this manner.

Figure 14:
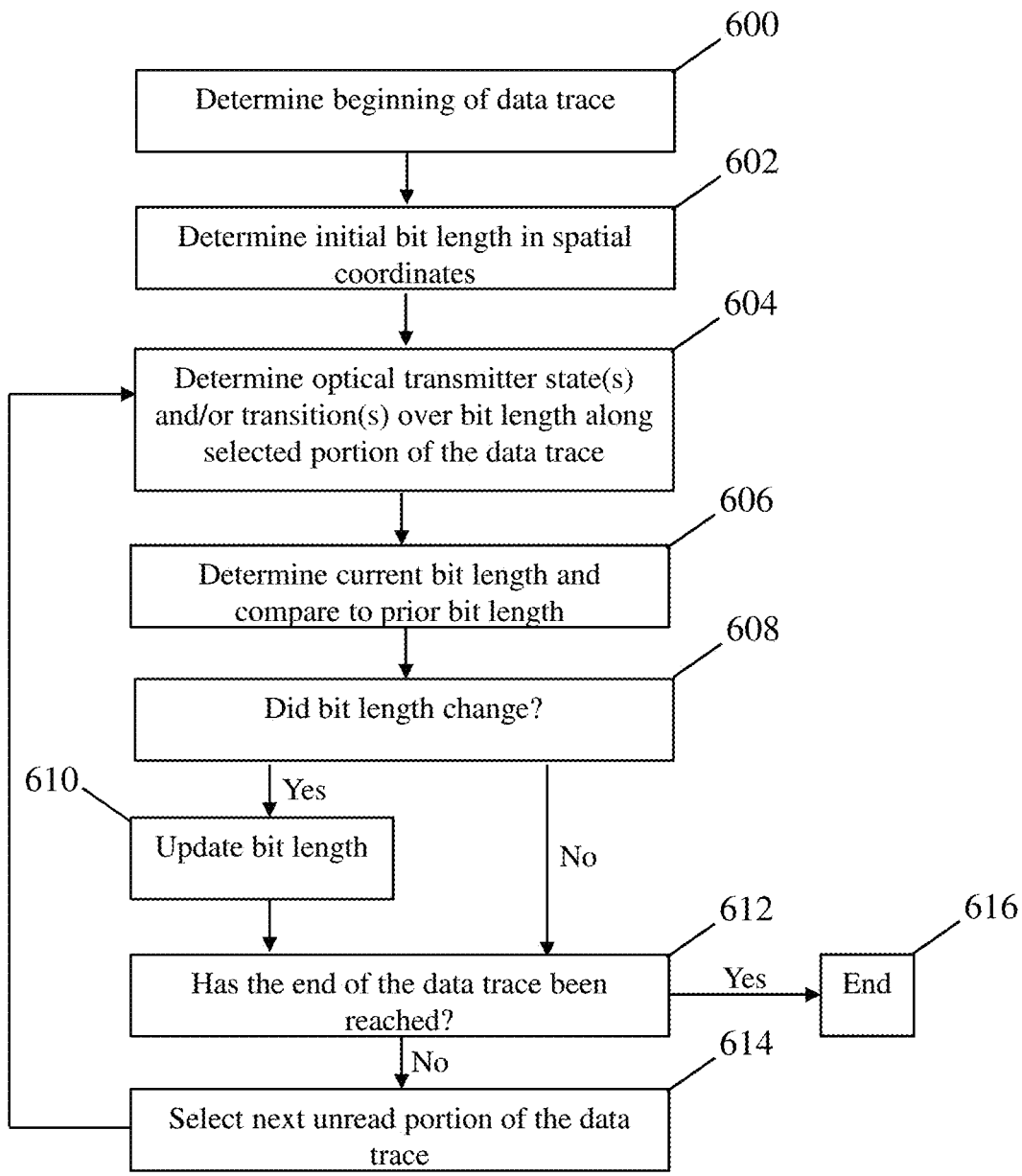
FIG. 14 is a flow diagram of one embodiment of a method for decoding bit stream segments captured as data traces in an image.

FIG. 14 depicts one possible embodiment for decoding a bit stream segment captured in a data trace within the spatial domain of an image. At 600, a processor applying the decoding algorithm to an identified data trace may determine a beginning of a data trace for decoding purposes. This may be done in a number of different ways. For example, in some embodiments a direction of relative movement of an optical transmitter and imaging device associated with the image may be stored in the image file and/or in a separate data structure associated with the image. In one such embodiment, motion sensors including one or more of an inertial monitoring unit, an accelerometer, a magnetometer, a gyroscope, and/or any other appropriate motion sensor may be used to detect a direction of motion of an imaging device and/or optical transmitter during image capture. The detected motion may then be used to determine the beginning end of a data trace based on the detected direction of motion. Alternatively, a data trace may include a bit stream segment with a header, or other appropriate data structure, that indicates a direction in which the data trace should be read. In yet another embodiment, a direction of motion and a direction for reading the captured data traces may be known or predetermined. Therefore, the read direction for the captured data traces may also be predetermined. Of course other ways of determining a beginning end and/or a read direction of a data trace for decoding purposes are also contemplated as the disclosure is not limited in this fashion.

Once a beginning of a data trace has been determined, a processor decoding the data trace may proceed with reading the bit stream segment contained in the data trace. As noted above, the mapping of a blink pattern of an optical transmitter from the time domain onto the spatial domain of an image may not be uniform. Therefore, in some embodiments, a decoder may determine an initial bit length in the spatial coordinates of the image at 602. This may be done in a number of ways including for example: an average bit length determined using a transmission frequency as well as a relative speed and size of an optical transmitter within a field of view of an imaging device; a predetermined initial bit length; a bit length determined by reading a clock signal associated with the first bit; and/or any other appropriate method for determining an initial bit length in the spatial domain of the image.

Once an initial bit length has been determined, the decoder may read the first bit by determining one or more states and/or transitions of the optical transmitter over a length of the data trace corresponding to the current bit length at 604. Depending on the particular encoding scheme and data signal captured in the data trace, this reading process may correspond to a number of different decoding methods. For example, in an embodiment where a separate clocking signal is included in one or more data traces in an image, the decoder may simply determine a modulation state of the optical transmitter over the bit length. Alternatively, when a self-clocking encoding scheme has been used for transmitting the one or more bit stream segments, the decoder may determine the modulation states and/or transitions between the modulation states of the optical transmitter to determine the bit being read from that portion of the data trace. Once read, the individual bit may be added to a decoded bit stream segment. The different modulation states of the optical transmitter captured in a data trace may be determined in any appropriate fashion including, for example: a signal intensity or contrast being greater than or less than a threshold signal intensity; a signal intensity or contrast being greater than or less than an overall and/or moving average of the signal intensity; changes in color of the signal; changes in hue of the signal; and/or any other appropriate method for determining the modulation states of an optical transmitter captured in an image. In some embodiments, a midpoint value of a signal within an individual bit may be read to minimize noise in the read out signal which may occur when transitioning between the two or more modulation states of an optical transmitter.

After reading a bit included in the current section of a data trace, at 606, a decoder may also determine a current bit length in spatial coordinates of the image using a clocking signal included in either the data trace being read and/or with a separate clocking signal included in the same image. For example, in the instance where a separate clock signal is used, a bit length in spatial coordinates may be determined for each bit included in the data traces by measuring the distance within the image occupied by each modulation cycle of the clock signal. These distances may then be included in a timing signal data set which may be used to decode the bits included in other data traces within the image. Alternatively, in instances where a self-clocking signal is included in the bit stream captured in a data trace, the decoder may determine a spatial distance within the image between expected modulation transitions to determine a bit length of the current bit being read. In either case, once a bit length in spatial coordinates has been determined for the current bit, the newly determined bit length may be compared to the currently set bit length at 608. If the bit length has changed, the bit length may be updated at 610 for reading the next bit contained in the next portion of the data trace. This update of the bit length in spatial coordinates may be done using: a moving average; the currently measured bit length; a bit length determined from a separate decoded clock signal; and/or any other appropriate method for updating a bit length for reading the next bit as the disclosure is not limited in this manner. A decoder may continue this process of sequentially updating the bit length, selecting the next unread portion of a data trace, reading the next bit, and adding the read bit to a bit stream segment until an end of the data trace has been reached at 612, 614, and 616. The decoded bit stream segment obtained from the data trace may then be stored in memory and/or instructions contained therein may be executed as previously discussed above.

Depending on the particular type of encoding used to transmit the one or more bit stream segments, a decoder may use any appropriate decoding scheme. For example, possible encoding schemes may include, but are not limited to: full data encoding schemes with a separate clocking signal;

Manchester encoding with a sync-region (i.e. header); and/or any other appropriate encoding scheme. Additionally, in some embodiments multiple data traces within a single image including separate bit stream segments may be encoded using either the same and/or different encoding schemes since the disclosed optical communication methods are capable of transmitting and receiving multiple bit streams at once with a single imaging device. Additionally, in other embodiments, full color information can be used within an image to perform bit stream segment transmission using multiple color channels. In some applications, coincidence of codes from different color channels and/or separate optical transmitters can optionally be used to indicate higher or lower confidence in the detection of a particular bit stream segment.

Figure 15:
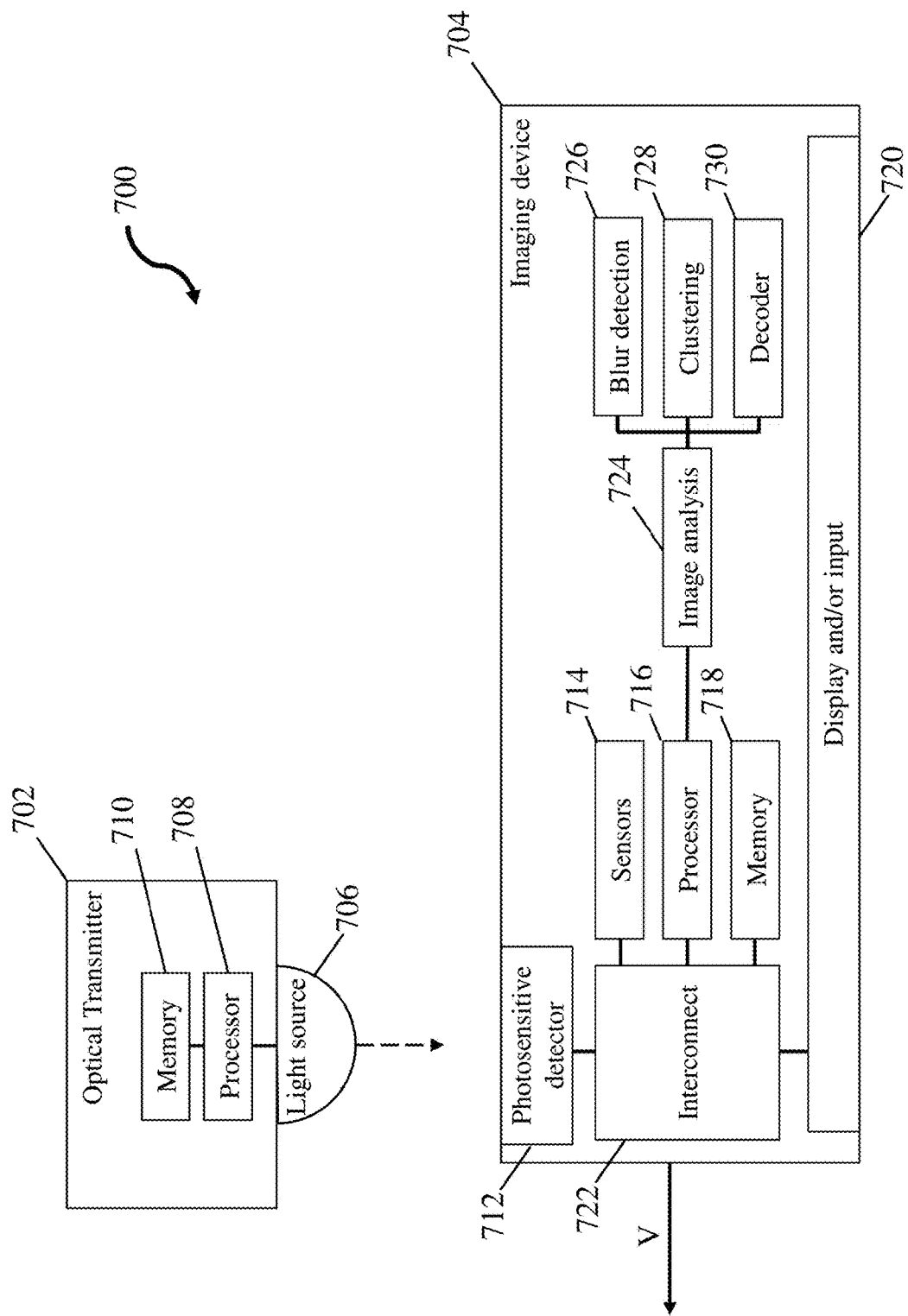
FIG. 15 is a schematic representation of one embodiment of an optical communication system.

Having described possible methods for the transmission and acquisition of a bit stream, one possible embodiment of an optical communication system for implementing the methods described herein is depicted in FIG. 15. In the depicted embodiment, an optical communication system 700 includes at least one optical transmitter 702 and a corresponding imaging device 704. Similar to the embodiments described above, the imaging device and optical transmitter may be moved relative to each other in a translational and/or rotational direction as indicated by motion direction V. The optical transmitter includes a light source 706 that is operatively coupled to an associated first processor 708 and first memory 710. The first processor may control the light source to transmit one or more bit stream segments corresponding to a bit stream stored in the first memory. As previously described, the bit stream segments may be encoded as a pattern of modulation cycles of the light source which may correspond to changes in signal intensity transmitted by the light source (including full ON/OFF), changes in color transmitted by the light source, changes in hue transmitted by the light source, and/or any other appropriate encoding method as the disclosure is not so limited. In either case, the light may be transmitted from the light source of the optical transmitter towards the imaging device where it may be collected in one or more images.

The imaging device 704 may include a photosensitive detector 712 that includes an array of pixels constructed to collect an image of the light source 706 of the optical transmitter within a field of view of the photosensitive detector. The imaging device may also include an interconnect 722, one or more sensors 714, a second processor 716, a second memory 718, and a display and/or input in the form of a touchscreen 720 that is stylus and/or finger sensitive. While a touchscreen has been depicted in the figure, other appropriate types of user inputs such as a keyboard, buttons, a mouse, and/or any other appropriate type of input may be used. Additionally, a separate display, and in some embodiments, no display, may be used as the disclosure is not limited to the use of a touchscreen. In the depicted embodiment, the interconnect may route signals, commands, and/or inputs between the various components of the imaging device. For example, signals indicative of the motion V detected by the one or more sensors may be transmitted to the processor for triggering image collection for data acquisition as described previously. Alternatively, in other embodiments, a user input provided from the touchscreen may be provided to the processor to trigger image collection.

As also shown in FIG. 15, the processor 716 of the imaging device 704 may be used to execute an image analysis module 724 to identify the presence of one or more data traces within one or more images collected by the imaging device. The image analysis module may include submodules that are executed by the processor as previously described. For example, the image analysis module may include a blur detection module 726, a clustering module 728 and a decoder module 730 to identify blurred regions of an image including one or more data traces, identify and isolate the one or more data traces, and subsequently decode the one or more data traces to obtain one or more decoded bit stream segments. The decoded bit stream segments, and/or, in some embodiments, a combined bit stream formed from the individual decoded bit stream segments, may then be stored in the memory 718 subsequent recall and/or execution by the processor. For example, the bit stream may include computer executable instructions that may be executed by the processor to perform one or more desired functions. Alternatively, the bit stream segments and/or combined bit stream may be transmitted to a separate computing device, not depicted, that is external to the imaging device for subsequent storage and/or execution.

The above-described embodiments may be implemented in any of numerous ways. For example, the embodiments may be implemented using hardware, software or a combination thereof. When implemented in software, the software code can be executed on any suitable processor or collection of processors, whether provided in a single computing device or distributed among multiple computing devices. Such processors may be implemented as integrated circuits, with one or more processors in an integrated circuit component, including commercially available integrated circuit components known in the art by names such as CPU chips, GPU chips, microprocessor, microcontroller, or co-processor. Alternatively, a processor may be implemented in custom circuitry, such as an ASIC, or semicustom circuitry resulting from configuring a programmable logic device. As yet a further alternative, a processor may be a portion of a larger circuit or semiconductor device, whether commercially available, semi-custom or custom. As a specific example, some commercially available microprocessors have multiple cores such that one or a subset of those cores may constitute a processor. Though, a processor may be implemented using circuitry in any suitable format.

Further, it should be appreciated that a computing device may be embodied in any of a number of forms, such as a rack-mounted computer, a desktop computer, a laptop computer, or a tablet computer. Additionally, a computing device may be embedded in a device not generally regarded as a computing device but with suitable processing capabilities, including a Personal Digital Assistant (PDA), a smart phone, tablet, or any other suitable portable or fixed electronic device.

Also, a computing device may have one or more input and output devices. These devices can be used, among other things, to present a user interface. Examples of output devices that can be used to provide a user interface include display screens for visual presentation of output and speakers or other sound generating devices for audible presentation of output. Examples of input devices that can be used for a user interface include keyboards, individual buttons, touchscreens, and pointing devices, such as mice, touch pads, and digitizing tablets. As another example, a computing device may receive input information through speech recognition or in other audible format.

Such computing devices may be interconnected by one or more networks in any suitable form, including as a local area network or a wide area network, such as an enterprise network or the Internet. Such networks may be based on any suitable technology and may operate according to any suitable protocol and may include wireless networks, wired networks or fiber optic networks.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the embodiments described herein may be embodied as a computer readable storage medium (or multiple computer readable media) (e.g., a computer memory, one or more floppy discs, compact discs (CD), optical discs, digital video disks (DVD), magnetic tapes, flash memories, RAM, ROM, EEPROM, circuit configurations in Field Programmable Gate Arrays or other semiconductor devices, or other tangible computer storage medium) encoded with one or more programs that, when executed on one or more computing devices or other processors, perform methods that implement the various embodiments discussed above. As is apparent from the foregoing examples, a computer readable storage medium may retain information for a sufficient time to provide computer-executable instructions in a non-transitory form. Such a computer readable storage medium or media can be transportable, such that the program or programs stored thereon can be loaded onto one or more different computing devices or other processors to implement various aspects of the present disclosure as discussed above. As used herein, the term "computer-readable storage medium" encompasses only a non-transitory computer-readable medium that can be considered to be a manufacture (i.e., article of manufacture) or a machine. Alternatively or additionally, the disclosure may be embodied as a computer readable medium other than a computer-readable storage medium, such as a propagating signal.

The terms "program" or "software" are used herein in a generic sense to refer to any type of computer code or set of computer-executable instructions that can be employed to program a computing device or other processor to implement various aspects of the present disclosure as discussed above. Additionally, it should be appreciated that according to one aspect of this embodiment, one or more computer programs that when executed perform methods of the present disclosure need not reside on a single computing device or processor, but may be distributed in a modular fashion amongst a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

The embodiments described herein may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Further, some actions are described as taken by a "user." It should be appreciated that a "user" need not be a single individual, and that in some embodiments, actions attributable to a "user" may be performed by a team of individuals and/or an individual in combination with computer-assisted tools or other mechanisms.

Example: Transmission and Acquisition of a Bit Stream During Relative Movement

An LED fiber was formed containing 7 discrete green LEDs disposed along a length of the fiber. The LEDs were driven using a circuit board capable of outputting various waveforms and the circuit board included a separate red LED. Each of the green and red LEDs were driven by the circuit board using the same waveform. In this case, the LEDs were driven at a frequency of 3.6 kHz using Manchester encoding. The specific hexadecimal code being continuously transmitted was "F"-"0". Converting hexadecimal "F" to binary gives "1-1-1-1" and "0" gives "0-0-0-0". Since Manchester encoding is a self-clocking system, a binary "1" is transmitting using "ON-OFF" and a binary "0" is transmitted using "OFF-ON". Therefore, in this experiment the expected repeating blink pattern of the LEDs was "ON-OFF-ON-OFF-ON-OFF-ON-OFF-OFF-ON-OFF-ON-OFF-ON-OFF-ON".

Once transmission of the signal by the LEDs was begun, a camera was moved very fast in a left to right motion past the fiber while collecting video. The individual image frames captured in the video were then reviewed and a screenshot including an image of the LEDs was identified. It was observed that each LED traced out a diagonal dash-dot pattern across the frame which formed a data trace as noted above. These dashes and dots represent the modulation states of each LED evolving in time. In other words, the bit streams transmitted by the LEDs in the time domain were captured as data traces in the spatial domain of the image in the form of the observed dash dot lines. When reviewed in more detail, it was confirmed that the structure of the dashes and dots corresponded to the transmitted "F" then "0" signal originally transmitted by the LEDs. In a follow-up experiment, the LED frequency was increased to 10 kHz and Manchester encoding (transmitting at 5 kbit/sec) was used to transmit a complete frame of an active LOOks id code 0x55501A which was successfully captured in an image.

Example: Image Analysis

Figure 16:
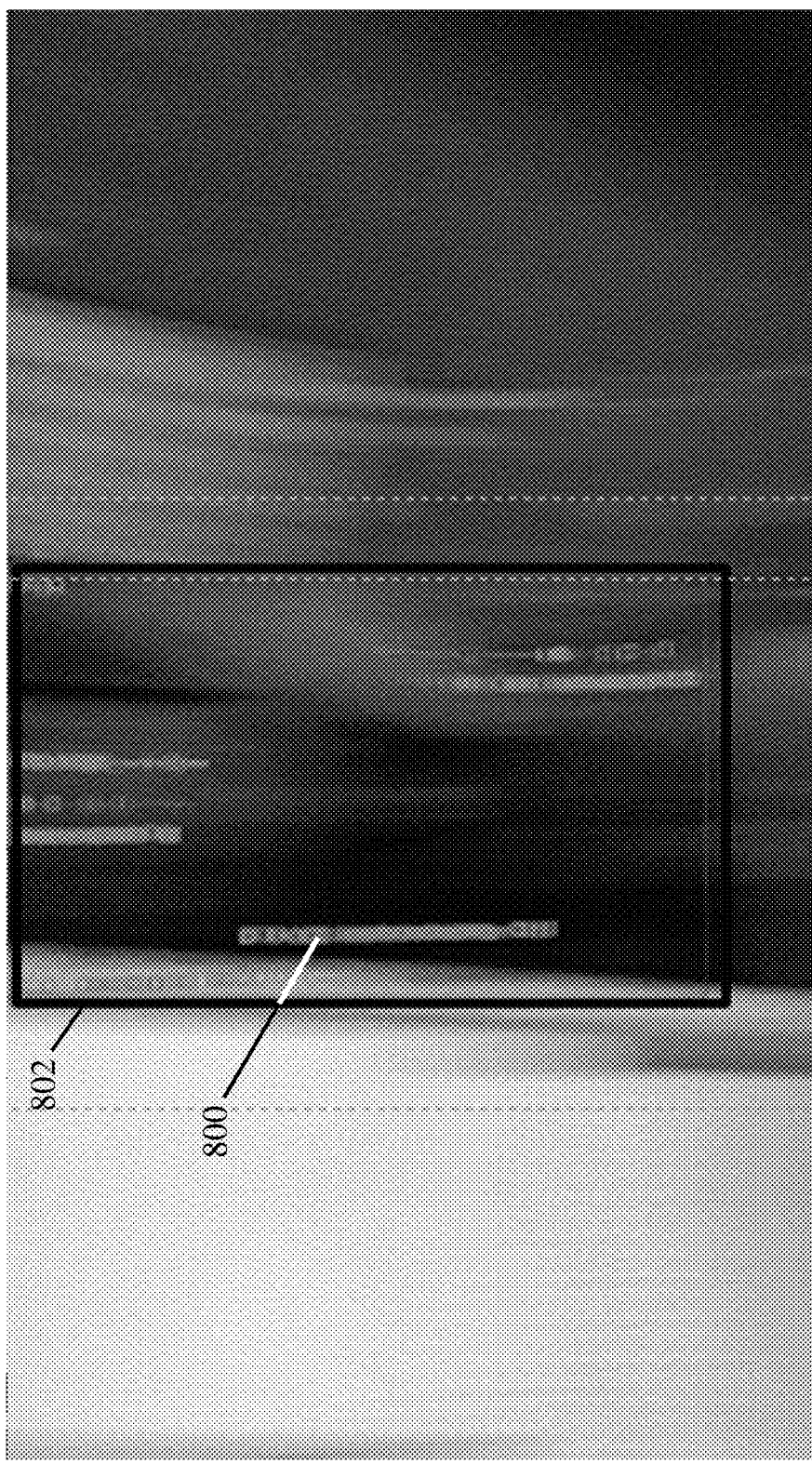
FIG. 16 is an example of an image captured during relative movement of an optical transmitter and an imaging device.

FIG. 16 is an example image frame including data traces 800 captured within the image frame. Again, the data traces correspond to the blink pattern of an optical transmitter during relative movement of an imaging device and the optical transmitter. As can be seen in the image, the background is blurry from relative motion between the camera and surrounding objects, as indicated by a low-clarity score of 6.87 (measured as variance of Laplacian across the image region of interest, which could be the entire image, or a section of the image). The presence of bit stream candidates corresponding to the relatively high contrast data traces as compared to the surrounding blurry portions of the image was indicated by an increased maximum Laplacian as compared to the lower average value of the Laplacian in surrounding portions of the image (242.00 for this image). A portion of the image that was isolated for further analysis and identification of the data traces is denoted by the box 802. This interior of the box includes the portion of the image exhibiting high local Laplacian values surrounded by the blurry portions of the image with lower average Laplacian values. The isolated region of the image was subsequently analyzed using a standard clustering algorithm to group the corresponding portions of the image into separate data traces for further analysis.

Figure 17:
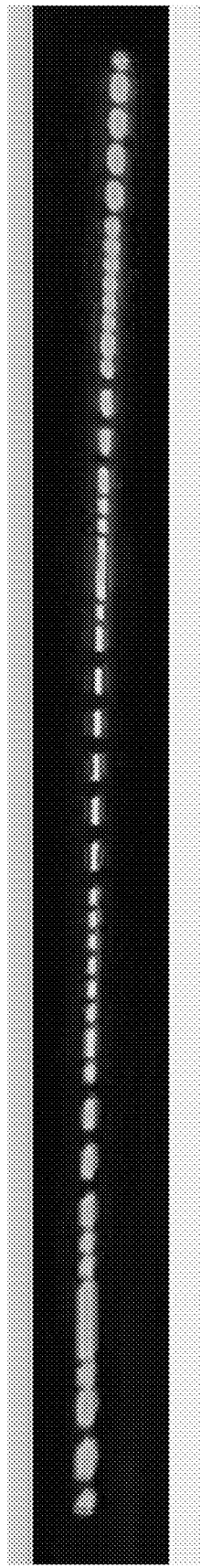
FIG. 17 is an example of a data trace identified in an image corresponding to a bit stream segment.
Figure 18:
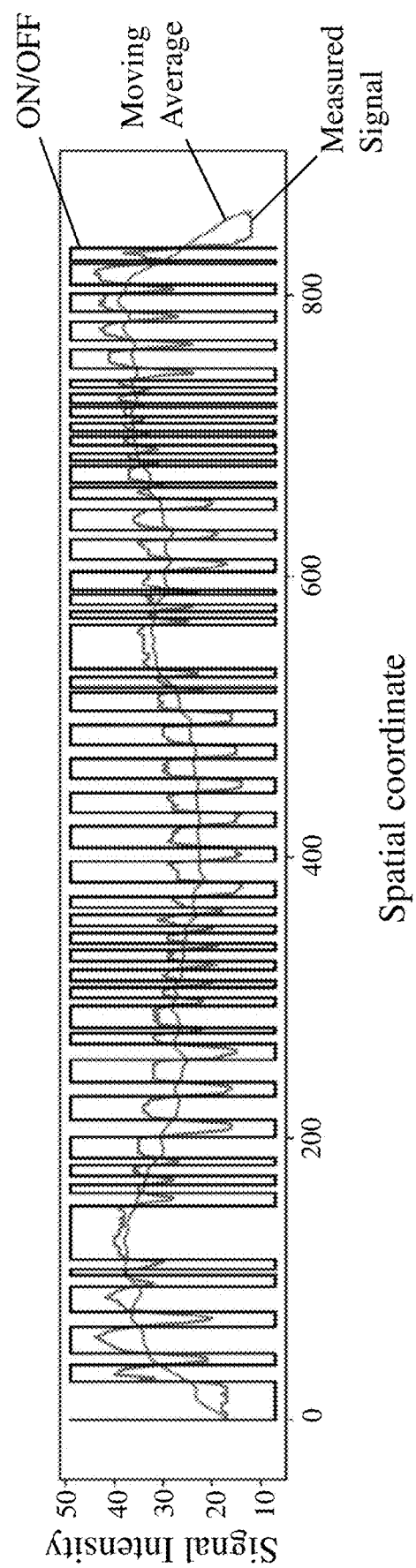
FIG. 18 is a graph of signal intensity versus a spatial coordinate for the data trace of FIG. 17.

FIG. 17 presents one of the isolated data traces identified in the image of FIG. 16. The image was turned into gray scale, though this is not a requirement, for further analysis and the resulting image was further reduced to a one dimensional (1D) data set. The data set included the signal intensity versus a spatial coordinate along a length of the data trace. The 1D data set was further processed as shown in FIG. 18 to determine the modulation states of the optical transmitter as indicated by the square wave which may be passed to a decoder to convert into bit stream. In this particular experiment, the modulation states were detected by determining if the signal intensity was greater than or less than a moving average of the signal intensity along a length of the data trace as also shown in the graph.

Example: Rotational Movement

Figure 19:
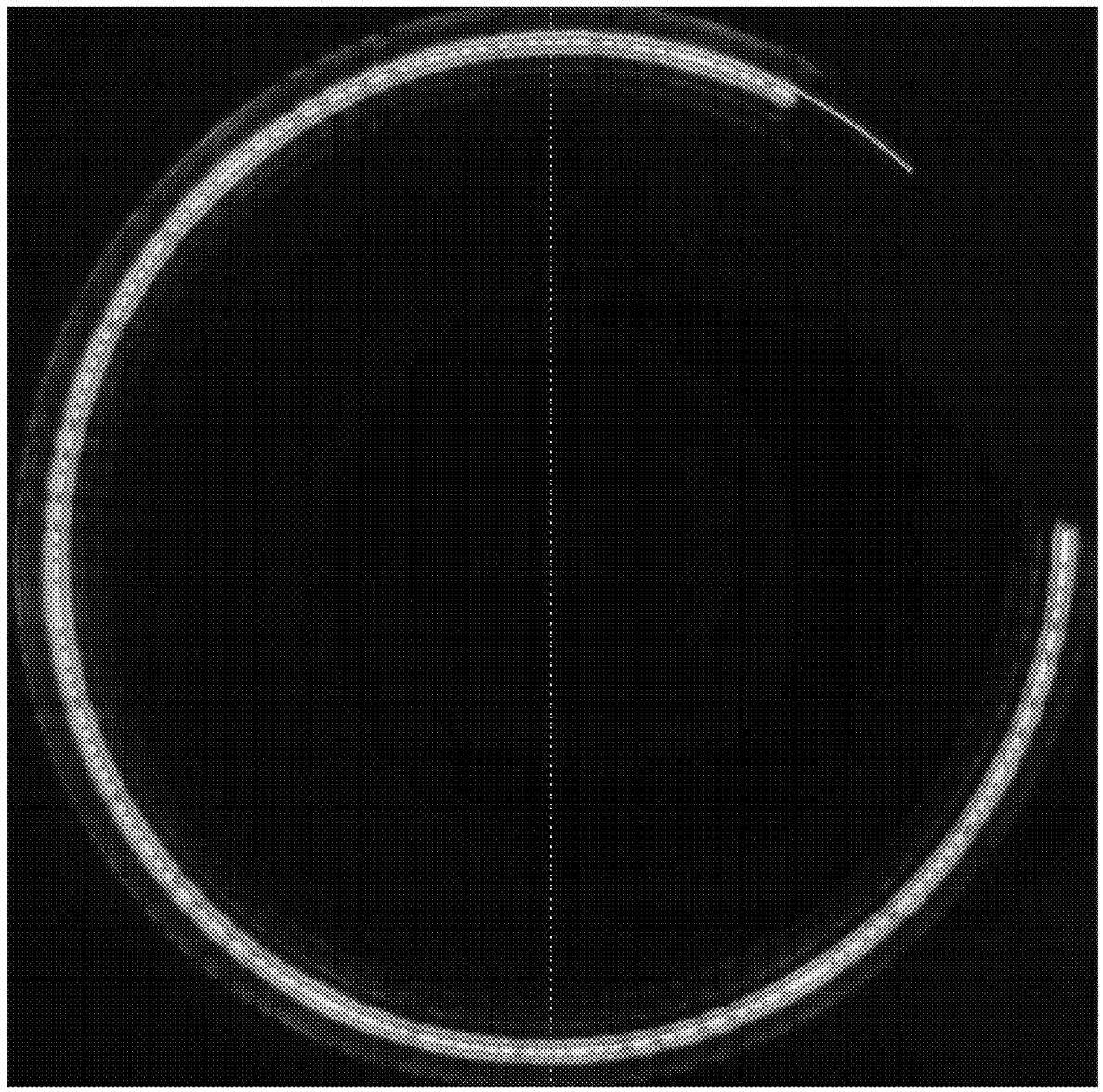
FIG. 19 is an example of an image captured during rotational motion of an optical transmitter within a field of view of an imaging device.

FIG. 19 shows a data trace captured during rotational movement of an optical transmitter relative to a mobile phone's camera. Specifically, an LED was attached to a rotary drill at a distance of 1.25 inches from the axis of rotation of the drill. The mobile phone's camera was positioned 12 inches from the drill and the drill was rotated while the LED was operated at a transmission frequency of 3.6 kHz. Assuming Manchester encoding, this would correspond to a data transmission rate of about 1.8 kbps.

To estimate rotational frequency of the drill, the aperture value of the camera was changed from ¼ (250 ms) to ½000 (0.5 ms) to determine the rotational speed of the drill and a corresponding appropriate frame duration for bit stream transmission. Specifically, the aperture value was changed until a uniform circle was produced which corresponded to an aperture setting of ⅑ which is equivalent to an exposure time of 111 ms. Based on this value it was determined that the rotational frequency of the drill was about 540 RPM. To enable the capture of as much data as possible in a single frame, the frame duration for capturing an image may be set as large as possible in the image while avoiding the LED, or other optical transmitter, traversing more than a full circle within the field of view of the imaging device which would overwrite some of the transmitted data. One exemplary image of a data trace captured over 100 ms, and which included about 160 bits, is shown in FIG. 19. This corresponds to a transmission rate of about 1.6 kbps. Of course, a faster rotation speed and larger radius of rotation (i.e. larger data trace length within a field of view) may both increase the achievable bit rate for data transmission. Although with faster rotation, the exposure time may need to be reduced accordingly.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art. Accordingly, the foregoing description and drawings are by way of example only.

What is claimed is:

1. An optical communication system comprising:
    an imaging device configured to collect one or more images of one or more optical transmitters during relative motion of the imaging device and the one or more optical transmitters;
    one or more processors configured to:
        identify one or more data traces in the one or more images; and
        decode the one or more data traces from a spatial domain of the one or more images to obtain one or more bit stream segments transmitted by the one or more optical transmitters;
        wherein the one or more data traces are one or more portions within the one or more images corresponding to motion blur of the one or more optical transmitters.

2. The optical communication system of claim 1, wherein the one or more optical transmitters transmit the one or more bit stream segments as a pattern of sequential modulation cycles, and wherein the relative motion is sufficiently fast and an image integration time of the imaging device is sufficiently long so as to create motion blur such that the pattern of sequential modulation cycles are captured in separate pixels or groupings of pixels along a length of the one or more data traces.

3. The optical communication system of claim 1, wherein the one or more processors are configured to maintain a focus of the imaging device on the one or more optical transmitters during the relative motion of the imaging device and the one or more optical transmitters.

4. The optical communication system of claim 1, wherein the one or more processors are configured to detect motion blur to identify the one or more data traces.

5. The optical communication system of claim 4, wherein the one or more processors are configured to identify regions of increased contrast in the one or more images to identify the one or more data traces.

6. The optical communication system of claim 1, wherein the one or more processors are further configured to remove a background from the one or more images to identify the one or more data traces.

7. The optical communication system of claim 6, wherein the one or more processors are further configured to remove the background from a first image using at least a second image.

8. The optical communication system of claim 1, wherein the one or more processors are configured to store the one or more bit stream segments in at least one non-transitory computer-readable storage medium.

9. The optical communication system of claim 1, wherein the one or more processors are configured to execute instructions contained in the one or more bit stream segments.

10. The optical communication system of claim 1, wherein the one or more bit stream segments are a plurality of bit stream segments, wherein the one or more images are a plurality of images, and wherein the one or more processors are configured to combine the plurality of bit stream segments.

11. The optical communication system of claim 1, wherein the one or more optical transmitters are configured to emit, and the imaging device is configured to detect, electromagnetic radiation with wavelengths in the ultraviolet, visible, and/or infrared spectrums.

12. At least one non-transitory computer-readable storage medium storing processor executable instructions for optical communication that, when executed by at least one processor, cause the at least one processor to perform a method comprising:
    collecting one or more images of one or more optical transmitters during relative motion of an imaging device and the one or more optical transmitters;

identifying one or more data traces in the one or more images; and decoding the one or more data traces from a spatial domain of the one or more images to obtain one or more bit stream segments transmitted by the one or more optical transmitters;

wherein the one or more data traces are one or more portions within the one or more images corresponding to motion blur of the one or more optical transmitters.

13. The at least one non-transitory computer-readable storage medium of claim 12, wherein the one or more optical transmitters transmit the one or more bit stream segments as a pattern of sequential modulation cycles, and wherein the relative motion is sufficiently fast and an image integration time of the imaging device is sufficiently long so as to create motion blur, such that the pattern of sequential modulation cycles are captured in separate pixels or groupings of pixels along a length of the one or more data traces.

14. The at least one non-transitory computer-readable storage medium of claim 12, wherein the method further comprises maintaining a focus on the one or more optical transmitters during the relative motion of the imaging device and the one or more optical transmitters.

15. The at least one non-transitory computer-readable storage medium of claim 12, wherein identifying the one or more data traces includes detecting motion blur.

16. The at least one non-transitory computer-readable storage medium of claim 15, wherein identifying the one or more data traces includes identifying regions of increased contrast in the one or more images to identify the one or more data traces.

17. The at least one non-transitory computer-readable storage medium of claim 12, wherein the method further comprises removing a background from the one or more images to identify the one or more data traces.

18. The at least one non-transitory computer-readable storage medium of claim 17, wherein removing the background from the one or more images includes removing the background from a first image using at least a second image.

19. The at least one non-transitory computer-readable storage medium of claim 12, wherein the method further comprises storing the one or more bit stream segments in a second non-transitory computer-readable storage medium.

20. The at least one non-transitory computer-readable storage medium of claim 12, wherein the method further comprises executing instructions contained in the one or more bit stream segments with the at least one processor.

21. The at least one non-transitory computer-readable storage medium of claim 12, wherein the one or more bit stream segments are a plurality of bit stream segments, wherein the one or more images are a plurality of images, and wherein the method further comprises combining the plurality of bit stream segments.

22. The at least one non-transitory computer-readable storage medium of claim 12, wherein the one or more optical transmitters are configured to emit, and the imaging device is configured to detect, electromagnetic radiation with wavelengths in the ultraviolet, visible, and/or infrared spectrums.

23. A computer-implemented method for optical communication, the method comprising:

collecting one or more images of one or more optical transmitters with an imaging device during relative motion between the imaging device and the one or more optical transmitters, wherein the one or more optical transmitters transmit one or more bit stream segments as a pattern of sequential modulation cycles, and wherein the relative motion is sufficiently fast and an image integration time of the imaging device is sufficiently long so as to create motion blur, such that the one or more bit stream segments are captured as one or more data traces in the one or more images;

wherein the one or more data traces are one or more portions within the one or more images corresponding to motion blur of the one or more optical transmitters.

24. The computer-implemented method of claim 23, further comprising identifying the one or more data traces in the one or more images.

25. The computer-implemented method of claim 24, wherein identifying the one or more data traces includes detecting motion blur.

26. The computer implemented method of claim 24, further comprising removing a background from the one or more images to identify the one or more data traces.

27. The computer implemented method of claim 26, wherein removing the background from the one or more images includes removing the background from a first image using at least a second image.

28. The computer-implemented method of claim 24, wherein identifying the one or more data traces includes identifying regions of increased contrast in the one or more images to identify the one or more data traces.

29. The computer-implemented method of claim 23, further comprising decoding the one or more data traces from a spatial domain of the one or more images to obtain the one or more bit stream segments transmitted by the one or more optical transmitters.

30. The computer-implemented method of claim 23, wherein the relative motion is sufficiently fast and the image integration time of the imaging device is sufficiently long so as to create motion blur, such that the pattern of sequential modulation cycles are captured in separate pixels or groupings of pixels along a length of the one or more data traces.

31. The computer-implemented method of claim 23, wherein the method further comprises maintaining a focus on the one or more optical transmitters during the relative motion of the imaging device and the one or more optical transmitters.

32. The computer-implemented method of claim 23, wherein the method further comprises storing the one or more bit stream segments in a non-transitory computer-readable storage medium.

33. The computer-implemented method of claim 23, wherein the method further comprises executing instructions contained in the one or more bit stream segments with a processor.

34. The computer-implemented method of claim 23, wherein the one or more bit stream segments are a plurality of bit stream segments, wherein the one or more images are a plurality of images, and wherein the method further comprises combining the plurality of bit stream segments.

35. The computer-implemented method of claim 23, wherein the one or more optical transmitters are configured to emit, and the imaging device is configured to detect, electromagnetic radiation with wavelengths in the ultraviolet, visible, and/or infrared spectrums.

* * * * *

UNITED STATES PATENT AND TRADEMARK OFFICE
CERTIFICATE OF CORRECTION

| | | |
|---|---|---|
| PATENT NO. | : 11,552,706 B2 | Page 1 of 1 |
| APPLICATION NO. | : 16/832066 | |
| DATED | : January 10, 2023 | |
| INVENTOR(S) | : Jason Cox et al. | |

It is certified that error appears in the above-identified patent and that said Letters Patent is hereby corrected as shown below:

In the Specification

At Column 1, Line 10, please insert the following paragraph directly after the "RELATED APPLICATIONS" section and before the "FIELD" section:
--STATEMENT REGARDING FEDERALLY SPONSORED RESEARCH OR DEVELOPMENT
This invention was made with U.S. Government support under Agreement Number W15QKN-16-3-0001, awarded by Army Contracting Command - New Jersey (ACC-NJ). The Government has certain rights in the invention.--

Signed and Sealed this
Thirtieth Day of April, 2024

*Katherine Kelly Vidal*

Katherine Kelly Vidal
*Director of the United States Patent and Trademark Office*